United States Patent
Sugiyama

(10) Patent No.: US 9,170,765 B2
(45) Date of Patent: Oct. 27, 2015

(54) PRINTING SYSTEM, INFORMATION PROCESSING APPARATUS, AND METHOD TO BE USED THEREIN

(75) Inventor: Hideki Sugiyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 212 days.

(21) Appl. No.: 13/154,313

(22) Filed: Jun. 6, 2011

(65) Prior Publication Data

US 2011/0304883 A1 Dec. 15, 2011

(30) Foreign Application Priority Data

Jun. 9, 2010 (JP) ................................. 2010-132136
Jan. 14, 2011 (JP) ................................. 2011-005953

(51) Int. Cl.
*G06F 3/12* (2006.01)
*G06F 9/44* (2006.01)

(52) U.S. Cl.
CPC ............ *G06F 3/1285* (2013.01); *G06F 3/1203* (2013.01); *G06F 3/1225* (2013.01); *G06F 9/4411* (2013.01)

(58) Field of Classification Search
USPC ......................................... 358/1.15; 717/100
See application file for complete search history.

(56) References Cited

U.S. PATENT DOCUMENTS

| | | | | |
|---|---|---|---|---|
| 5,828,855 A | * | 10/1998 | Walker | 710/305 |
| 2004/0250265 A1 | * | 12/2004 | Suzuki et al. | 719/321 |
| 2008/0201726 A1 | * | 8/2008 | Nagashima | 719/327 |
| 2010/0085599 A1 | * | 4/2010 | Nomura | 358/1.15 |
| 2010/0214603 A1 | * | 8/2010 | Tamura | 358/1.15 |

FOREIGN PATENT DOCUMENTS

| | | |
|---|---|---|
| JP | 2001-117834 A | 4/2001 |
| JP | 2004-102344 A | 4/2004 |
| JP | 2006-011831 A | 1/2006 |
| JP | 2010-092158 A | 4/2010 |

\* cited by examiner

*Primary Examiner* — King Poon
*Assistant Examiner* — Andrew H Lam
(74) *Attorney, Agent, or Firm* — Canon U.S.A., Inc. IP Division

(57) ABSTRACT

A printing system including a printer for storing a setup program for installing a printer driver and an information processing apparatus, wherein the information processing apparatus starts up the setup program acquired from the printer, when the printer driver is installed, identifies an attribute of an OS running on the information processing apparatus, creates a port having a port name according to a predetermined format according to the identified attribute of the OS, and installs the printer driver.

9 Claims, 26 Drawing Sheets

FIG. 3

| DEVICE NAME | STATE | PRODUCT NAME | IP ADDRESS | SERIAL No. | LOCATION | COMMENT |
|---|---|---|---|---|---|---|
| iR-ADV C5051 | | iR-ADV C5051 | 172.24.152.16 | ABC00001 | | |
| iR-ADV C5052 | | iR-ADV C5052 | 172.10.10.10 | ABC00002 | | |
| iR-ADV C5054 | | iR-ADV C5054 | 172.10.10.14 | ABC00004 | | |

FIG.4

| UPLOAD OF DRIVER | ☒ |

FILE PATH : C:¥Documents and Settings¥Cano  REFERENCE(B)...
DRIVER TYPE : Printer Driver A
VERSION : 20.20

DRIVER MODEL NAME(M) : C_iR-ADVC5045/5051
DISPLAY NAME (D) : C_iR-ADVC5045/5051
UPLOAD No.(L) : 1
COMMENT(C)

PORT(P) : ⦿ IP ADDRESS
○ HOST NAME
○ DESIGNATE PORT NAME
○ PORT NAME(N) :

BOX PATH (A) : ¥share¥folder
USER NAME(U) : Administrator
PASSWORD (W) : ********

[ OK ]  [ CANCEL ]

FIG. 5

Management Agent         TO REMOTE UI    LOG-IN USER : 0606060    LOG-OUT

DRIVER DOWNLOAD

DISPLAY UPDATE DATE AND TIME 2010/XX/YY

DRIVER LIST

| No. | DISPLAY NAME | DRIVER TYPE | VERSION | COMMENT | |
|---|---|---|---|---|---|
| 1 | C_iR-ADV C5045/5051 | Printer Driver A | 20.16 | | DOWNLOAD |
| 2 | C_CLX Printer | Printer Driver B | 1.13 | | DOWNLOAD |
| 3 | C_iR-ADV C5045/5051 (FAX) | Fax Driver A | 8.33 | | DOWNLOAD |

FIG. 16A

```
[DriverUploadInfo]
DriverModelName="C_iR-ADVC5045/5051"
PrinterName="C_iR-ADV C5051"
Comments="3F share printer"
PortType="1"
PortName=""
```

FIG. 16B

```
[DriverUploadInfo]
DriverModelName="C_iR-ADVC5045/5051"
PrinterName="Color Printer"
Comments="3F share printer"
PortType="1"
PortName=""
```

[InstallComplete]
Reboot=0
[SelectJob]
SelectJob=1
[PrinterInfo]
PRT1=

FIG. 17B

```
[InstallComplete]
Reboot=0
[SelectJob]
SelectJob=1
[PrinterInfo]
PRT1=Color Printer, C_iR-ADVC5045/5051, IP_172.10.10.10
```

FIG. 24

| Management Agent | | | | | | TO REMOTE UI LOG-IN USER: Administrator LOG-OUT |
|---|---|---|---|---|---|---|
| DEVICE SERIAL No. FN 0018 | | | | | | |
| MAIN MENU/DRIVER DOWNLOAD | | | | | | |
| DRIVER DOWNLOAD | | | | | UPDATE DATE AND TIME OF DISPLAY 2010/ / | |
| THIS IS A LIST OF DOWNLOADABLE PRINTER DRIVERS. CLICK "DOWNLOAD" BUTTON TO DOWNLOAD A FILE. WHEN THE DOWNLOADED FILE IS EXECUTED, THE PRINTER DRIVER IS INSTALLED. | | | | | | RETURN TO MENU |
| LIST OF DRIVERS | | | | | | |
| No. | DISPLAY NAME | DRIVER TYPE | VERSION | PATH | COMMENT | |
| 1 | C_iR-ADV C7055/7065 | C Printer Driver | 20.10 | ¥share¥folder¥addprinter1.exe | | DOWNLOAD UNINSTALLATION |
| 2 | C_iR-ADV C7055/7065 | C Printer Driver | 20.10 | ¥share¥folder¥addprinter2.exe | | DOWNLOAD UNINSTALLATION |
| 3 | C_iR-ADV C7055/7065 | C Printer Driver | 20.10 | ¥share¥folder¥addprinter3.exe | | DOWNLOAD UNINSTALLATION |

PRINTING SYSTEM, INFORMATION PROCESSING APPARATUS, AND METHOD TO BE USED THEREIN

BACKGROUND OF THE INVENTION

1. Field of the Invention

The present invention relates to a technique used in a printing system.

2. Description of the Related Art

Recently, printers are widely used in, for example, offices of companies and the printing can be performed by everybody with ease. To perform printing with a printer from a personal computer (PC), the PC requires installation of a printer driver for controlling the printer and generating print data. Generally, the printer driver is prepared for each operating system (OS) of the PC or each printer for printing and is provided by the storage medium such as a compact disc read only memory (CD-ROM) and a floppy disk (FD) packed with the printer. An administrator generally acquires the latest printer driver by downloading it from a web page of a manufacturer of the printer via a public network.

The acquired printer driver and setting information to be used in the installation of the printer driver are located in the storage device shared on the network, and the locations of the printer driver and the setting information are announced to the public users to allow them to use the printer. The public user installs the printer driver into the PC according to the information acquired from the location based on the announcement.

Conventionally, Japanese Patent Application Laid-Open No. 2010-092158 discusses such a technique as a method for installing the printer driver that an administrator creates setting information to be used by the installer as a definition file, and the definition file and the installer are called from a common execution file.

In the method discussed in Japanese Patent Application Laid-Open No. 2010-092158, the user can generate an execution file including freely set logical printer name and port name as the setting information to be used in the installation of the printer driver. When the user executes the execution file, if the logical printer designated by the setting information exists in the PC, the existing logical printer is overwritten with the setting information. In other words, if the port name designated in the setting information differs from the existing port name, a port is created with a newly designated port name. The port is set so as to be used in transmitting print data and, if the printer driver installed in the PC is outdated, the printer driver is updated.

In the method discussed in Japanese Patent Application Laid-Open No. 2010-092158, even if the user desires to update only the printer driver, the port is also newly created for the reason that the updated printer driver is released from the printer vendor. More specifically, such an issue may occur that a port name different from the existing port name is designated to a connection port of the logical printer. Accordingly, every time the printer driver is updated, an old port that is no longer used in the system may be left in the printer.

There is a method for causing the user to designate only an internet protocol (IP) address of the printer without allowing the user to designate an arbitrary port name. A format of the port name is formed into a stereotype format and the same IP address is associated with the same port name, so that a plurality of ports is not created with respect to the same IP address. For example, it is provided that, when "172.10.10.10" is designated as the IP address of the printer for executing printing, the port name is set to "IP_172.10.10.10". If the port having a port name of "IP_172.10.10.10" already exists, the existing port is used without creating a new port.

In a standard transmission control protocol (TCP)/IP port included as standard equipment in the OS, a different port name is automatically created according to the version of the OS. For example, when the "172.10.10.10" is designated as the IP address of the device for executing the printing, in the OS of a certain version (i.e., a first OS), if the port is created with the standard TCP/IP port of the OS, the port name becomes the "IP_172.10.10.10". On the other hand, in a case of the other OS having the other version (i.e., a second OS), if the port is created in a manner similar to the above, the port name becomes "172.10.10.10" by default.

A case where the port having the port name of "IP_172.10.10.10" is already created on the second OS is considered here. At this time, if the format of the port name is formed into the stereotype format, if the IP address of "172.10.10.10" is designated, the port having the port name of "172.10.10.10" comes to be newly created. More specifically, two ports including a port that is no longer used are created with respect to the IP address as the same printing destination.

SUMMARY OF THE INVENTION

The present invention is directed to a method for suitably registering a logical printer if a printer driver is installed into a PC.

According to an aspect of the present invention, an information processing apparatus including a storage unit includes an identification unit configured to identify an attribute of an OS running on the information processing apparatus if a device driver for controlling a device is installed, a determination unit configured to determine a format of a port name of a port to be created for the device driver to be installed according to the attribute of the OS identified by the identification unit, and a control unit configured to create the port in which the port name according to the format determined by the determination unit and information about a transmission destination of data included in setting information stored in the storage unit re set and to control the installation of the device driver in which the port is set.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates an example of a device selection screen according to the exemplary embodiment of the present invention.

FIG. 4 illustrates an example of a driver upload screen according to the exemplary embodiment of the present invention.

FIG. 5 illustrates an example of a driver download screen for a general user according to the exemplary embodiment of the present invention.

FIGS. 16A and 16B, respectively, illustrate an example of an information file necessary for a start-up of the setup program according to the exemplary embodiment of the present invention.

FIGS. 17A and 17B, respectively, illustrate an example of an information file requiring the installer according to the exemplary embodiment of the present invention.

FIG. 24 illustrates an example of a driver download screen for an administrator according to the exemplary embodiment of the present invention.

DESCRIPTION OF THE EMBODIMENTS

Various exemplary embodiments, features, and aspects of the invention will be described in detail below with reference to the drawings.

In the present invention, unless otherwise noted, the "printer driver" means software called from the OS for generating print data according to a print command from the application. The "logical printer" means a print queue on a spooler of the OS, i.e., a printer as software. The "logical printer name" is another name for identifying the logical printers.

The "port" means a collective name of a network port or a local port through which the logical printer transmits the print data to a physical device. One port usually is mapped to only one transmission destination (e.g., an IP address) of the print data. The "port name" is a name for identifying the ports. The "installer" is an application for installing the printer driver and includes an installation program and an information file including installation information. The installer can register the logical printer and creates the port concurrently with the installation of the printer driver.

Figure 1:
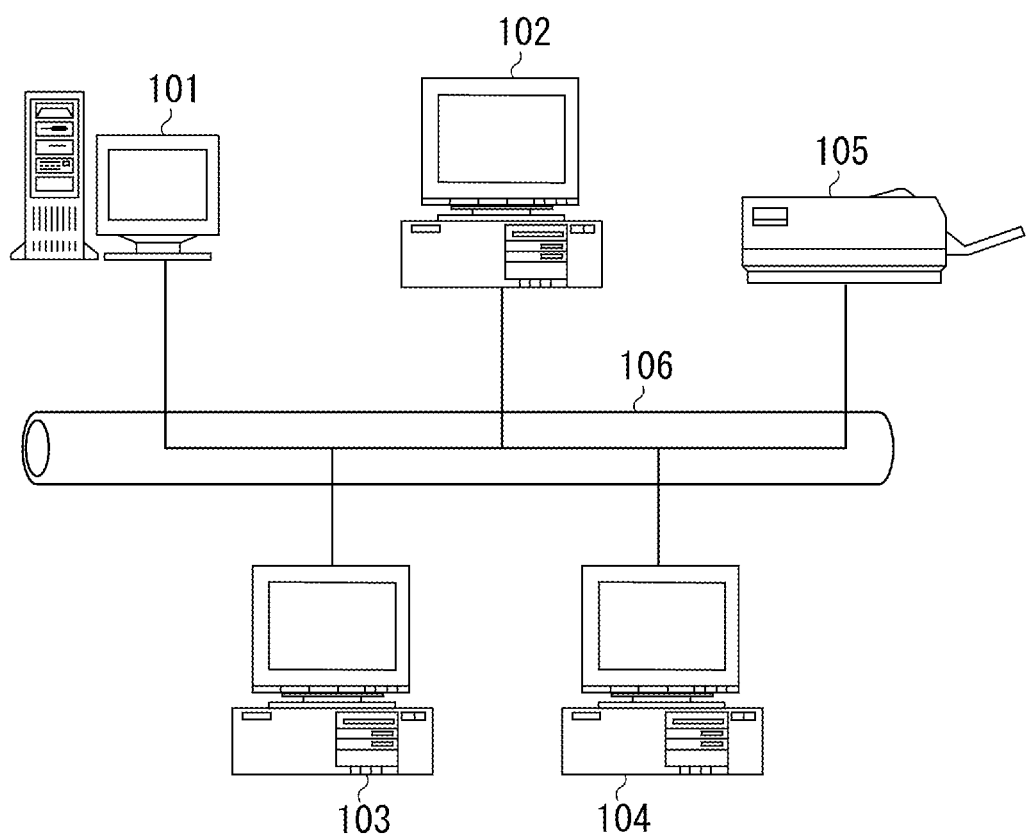
FIG. 1 is a block diagram illustrating an example of a configuration of a printing system according to an exemplary embodiment of the present invention.

A system according to a first exemplary embodiment of the present invention is described below. FIG. 1 is a block diagram illustrating an example of a configuration of the printing system to which the present invention is applicable. Unless otherwise noted, as far as the function of the present invention can be executed, the present invention can be applied to, as a matter of course, even a system including a single device or a system including a plurality of devices. Further, unless otherwise noted, as far as the function of the present invention can be executed, the present invention can be applied even to, as a matter of course, a system connectable via a local area network (LAN), a wide area network (WAN) or the like for performing processing.

Information processing apparatuses 101 through 104 are connected to a network 106 through a network cable such as the Ethernet (registered trademark). The information processing apparatuses 101 through 104 can execute various types of programs such as an application program and each of which includes a communication apparatus that can establish a bidirectional communication with the other devices connected to the network 106.

The information processing apparatus 101 is a management apparatus. The information processing apparatus 101 is hereinafter referred to as the management apparatus 101 for the sake of discrimination from the other information processing apparatuses. The management apparatus 101 stores various pieces of information relating to a printer 105 and has a function for compiling and storing a print log, an operation log and the like of the printer 105. The information processing apparatuses 102 through 104 are personal client computers and are collectively referred to as clients in order to discriminate them from the other information processing apparatus.

The printer 105 is connected to the network 106 via a network interface (not illustrated). The printer 105 analyses a job including print data transmitted from the clients 102, 103, and 104 to convert the print data into images page by page. Then, the printer 105 prints the images one by one. The printer 105 may be any one of a laser beam printer employing an electrophotographic printing method, an ink jet printer employing an ink jet printing method, a printer using a thermal transfer printing method, and the like.

Figure 2:
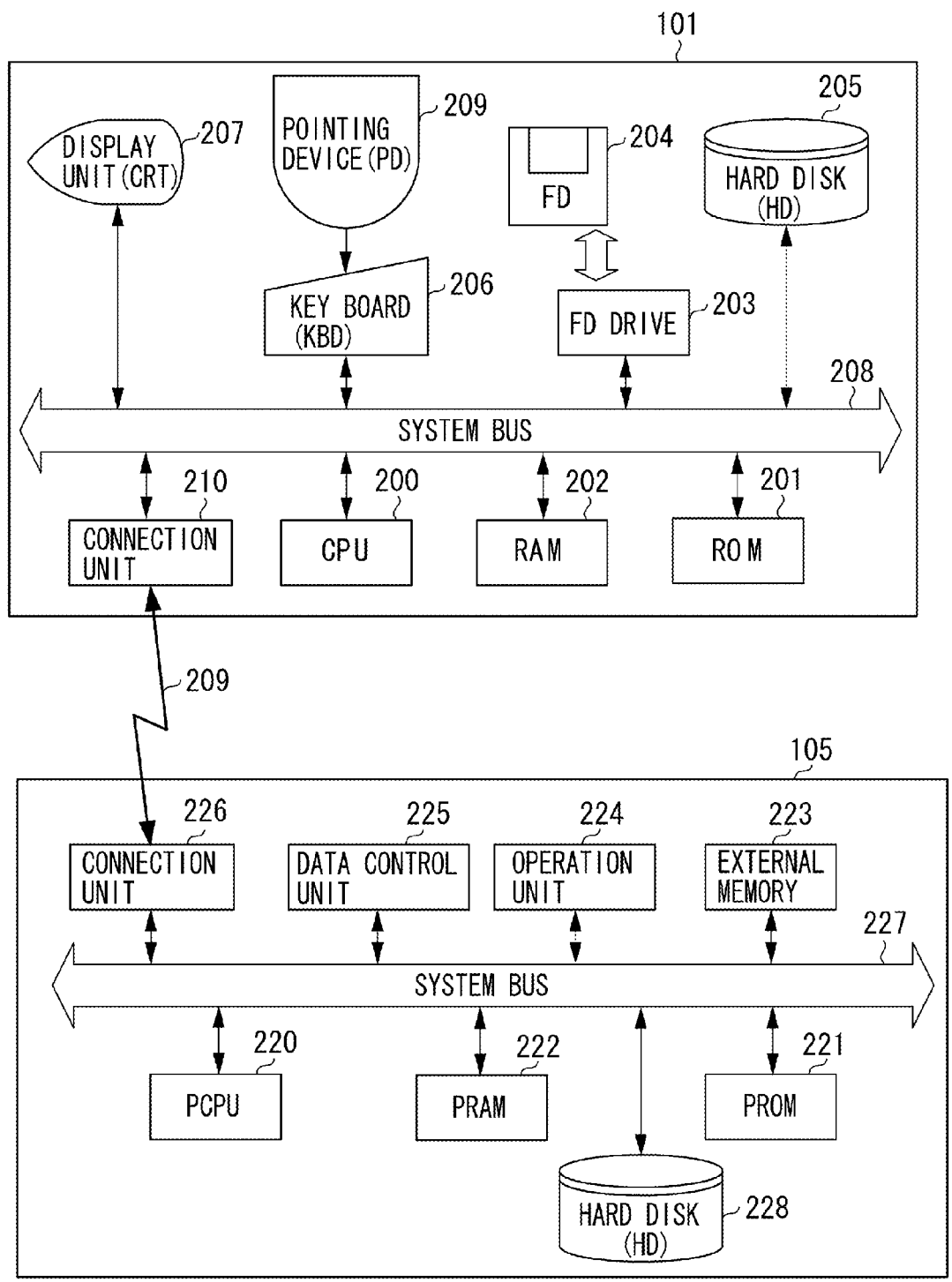
FIG. 2 is a block diagram illustrating an example of a detailed configuration of the printing system according to the exemplary embodiment of the present invention.

In FIG. 2, a central processing unit (CPU) 200 controls processing performed in each of the information processing apparatuses. The CPU 200 executes an application program, a printer driver program, an operating system (OS), a control program, or the like stored in a hard disk (HD) 205. The CPU 200 also performs a control for temporarily storing information, a file, or the like required for executing the program in a random access memory (RAM) 202.

A ROM 201 is a storage unit for storing therein a program such as a basic input/output (I/O) program, and various pieces of data such as font data and template data to be used in processing documents. The RAM 202 is a temporary storage unit and functions as a main memory or a work area of the CPU 200. A floppy (registered trademark) disk (FD) drive 203 is a storage medium reading unit. A program or the like stored in a floppy (registered trademark) disk (FD) 204 as a storage medium can be loaded to the present computer system as the client via the FD drive 203. The storage medium is not limited to the FD but may be, for example, any one of a compact disk read only memory (CD-ROM), a compact disk recordable (CD-R), a compact disk rewritable (CD-RW), a personal computer (PC) card, a digital versatile disk (DVD), an integrated circuit (IC) memory card, a magnet optical (MO) disk, a memory stick. The FD 204 stores a computer readable program.

The hard disk (HD) 205 is one of external storage units and functions as a large capacity memory for storing, for example, an application program, a printer driver program, an OS, a control program, and associated programs. Further, the HD 205 stores a spooler. The spooler is referred to as a client spooler in a side of the clients, whereas, the spooler is referred to as a server spooler in a side of a print server. The print server also stores job information received from the client. A table for controlling order is also stored in the printer server after being generated by the external storage unit.

A keyboard 206 is an input unit for receiving an input from a user. A display (i.e., a display unit) 207 displays a command input via the key board 206, information as to a below described application, or the like. A system bus 208 controls a flow of data within a computer as the client. An interface 209 allows the client to transmit data with an external device via the interface 209.

Now, a detailed configuration of the printer 105 is described below. The printer 105 mainly includes components such as a hard disk (HD) 228, a connection unit 226, a data control unit (a printer engine) 225, an operation unit 224, an external memory 223, a printer CPU (PCPU) 220, a printer RAM (PRAM) 222, and a printer ROM (PROM) 221. The above components are described below in detail. These components are connected to each other via a system bus 227.

The PCPU 220 controls the printer 105 in its entirety. The PCPU 220 transmits an image signal to the data control unit 225 according to a printer control command received via the connection unit 226 based on a control program stored in the below described PROM 221 or the external memory 223. The HD 228 is a large capacity storage device. The HD 228 is used as a storage destination of, for example, the font data or the print data. The HD 228 may be replaced with the storage device as an external device (not illustrated). In a case where the HD 228 is replaced with the external storage device, the printer 105 transmits data via the connection unit 226.

The PRAM 222 as a main memory of the PCPU 220 includes a storage area for temporarily storing various pieces of data. The PRAM 222 is used as a work area for data when the PCPU 220 executes controlling. The external memory 223 can be optionally connected in order to store the font data, an emulation program, form data, or the like. The PROM 221 is a printer built-in memory and stores, for example, a printer control program for controlling the various pieces of data and the present printer in a similar manner as the external memory.

The data control unit 225 is a printer engine and is controlled by the PCPU 220. The data control unit 225 receives an image signal output via the system bus 227 from the PROM 221 or the control program stored in the external memory 223 to actually perform print processing. The operation unit 224 includes an input unit such as an operation panel and an operation switch, and a display unit such as a light emitting diode (LED), a liquid crystal panel, and the like. The operation unit 224 receives an operation of an operator to display a result thereof. The operator can instructs and confirms settings of the printer according to the present exemplary embodiment via the operation unit 224. The connection unit 226 connects the printer 105 with the connection unit 210 of the information processing apparatuses via the above described bidirectional interface 209. Accordingly, the connection unit 226 can receive a print control command and notify the management apparatus of an interior condition of the printer 105.

FIG. 3 illustrates an example of a screen provided by a management application executed on the management apparatus 101 according to the present exemplary embodiment. The management application can additionally register a device under the management of the management apparatus by a user's operation. As it is illustrated in FIG. 3, the devices under the management can be listed and displayed together with ancillary information pieces such as states and IP addresses of the devices. Examples of the devices under the management include a printer having a print function, a scanner, and a multifunction peripheral having a facsimile function and a copy function together. In the screen, the user selects a device among the devices listed and presses a "registration of driver" button, so that a setting screen illustrated in FIG. 4 for setting an upload condition can be opened. When the user presses an "uninstallation of driver" button, a designation screen in FIG. 22 for designating a driver to be uninstalled is displayed.

FIG. 4 illustrates an example of the setting screen for displaying the upload condition provided by the management application executed on the management apparatus 101 according to the present exemplary embodiment. In this setting screen, when the user presses a "reference" button, a file selection dialog (not illustrated) is displayed. When the user designates a "setup.exe" file of the installer from the file selection dialog, a type of driver and a version of the installer are read out from thus designated "setup.exe" file and an associated file. The read out type of driver and the version of the installer are reflected to a "driver type:" text area and a "version:" text area of the setting screen, respectively.

A model name of the device designated by the management application illustrated in FIG. 3 is compared with model names in a list of driver models stored in the installer and a model name corresponding to the driver model is displayed in a "driver model" combo box. When the user presses an "OK" button in the screen, the below described settings of the display name and an upload number are reflected to the installer designated in the file selection dialog to be constituted as a setup program. Then, the setup program is uploaded to the storage device of the printer 105.

A driver model name set in the "driver model" combo box is set as an initial value of a "display name" text box. The user can edit the value in the "display name" text box to an arbitrary character string. The character string designated in the "display name" text box is displayed on the below described driver download page such that the user who performs the download thereof can recognize a target driver with ease.

An "upload No." combo box allows the user to designate an upload number in which the setup program to be uploaded is stored. The upload number can be designated from numbers 1 to 3. The storage device of the device preliminary secures a storage region corresponding to the upload number. If the user executes the upload by designating the upload number having already been stored in the setup program in the device, the existing setup program is invalidated and a newly uploaded setup program comes to be valid.

In a "comment" text box, the user can input an arbitrary comment. The character string designated in the comment text box is displayed on the below described driver download page such that the user performing the download can recognize the target driver with ease. Further, the character string is added as a comment to a property of a logical printer created by the client.

In a "port", the user can select a type of the port to be connected to the logical printer from an "IP address" radio button, a "host name" radio button, and a "designate port name" radio button. If the user designates the "designate port name" radio button, the "port name" text box becomes a state which can accept input therein and thus the user is allowed to input an arbitrary port name.

In a "box path" text box, the user designates a path of the storage device through which the setup program is uploaded. In a "user name" text box, the user designate the name of a user who has an access right to make an access to the path designated in the "box path" text box. In a "password" text box, the user designates a password of the user having the access right to the path designated in the "box path" text box.

Figure 22:
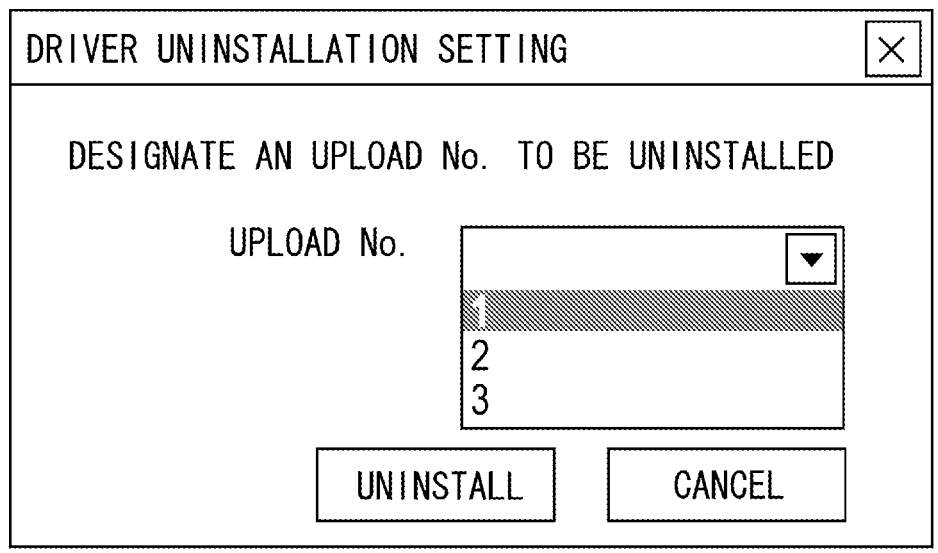
FIG. 22 illustrates an example of a designation screen for designating the driver to be uninstalled according to the exemplary embodiment of the present invention.

FIG. 22 illustrates an example of a designation screen for designating the driver to be uninstalled provided by the management application. On the screen, when the user designates the upload number in an "upload No." combo box and subsequently presses an uninstallation button, the upload number secured in the storage device of the device is used to uninstall the uploaded setup program.

FIG. 5 illustrates an example of a driver download screen for general users displayed on a display unit of the client 102 when a general user makes an access to a Web server included in the printer 105 according to the present exemplary embodiment from a Web browser 620 of the client 102. A Web server function unit 605 displays a log-in screen (not illustrated) on the Web browser 620 to receive an input of the user name of the user. The Web server function unit 605 determines the user name acquired from the above described log-in screen by an authority determination unit preliminary provided to the Web server function unit 605. If the acquired user name is a general user name, a download screen for administrator illustrated in FIG. 5 is displayed. In the download screen, a list of the setup programs uploaded to the device is displayed together with a "No." column, a "display name" column, a "driver type" column, a "version" column, a "comment" column, and a "download" button.

The "No." column displays the upload number designated in the "upload No." in the screen in FIG. 4. The "display name" column displays the character string designated in the "display name" in the screen in FIG. 4. The "driver type" column displays the character string set in the "driver type:" in the screen in FIG. 4. The "comment" column displays the character string designated in the "comment" in the screen in FIG. 4. The "version" column displays the character string set in the "version:" in the screen in FIG. 4.

When the user presses the "download" button in any of the rows, a download dialog (not illustrated) is displayed to start the download of the setup program. The setup program is downloaded to a download directory designated by the user in the above described download dialog.

FIG. 24 illustrates an example of a driver download screen displayed on the display unit of the client 102 when an administrator user accesses from the Web browser 620 of the client 102 to the Web server included in the printer 105 according to the present exemplary embodiment. If the above described authority determination unit determines that the access is made by the administrator user, the Web server function unit 605 displays the download screen illustrated in FIG. 24. The download screen displays a list of the setup programs uploaded to the device together with the "No." column, the "display name" column, the "driver type" column, the "version" column, the "path" column, the "comment" column, and the "download" button.

The columns of "No.", "display name", "driver type", "version", and "comment", and the "download" button are identical to those in the download screen for the general users illustrated in FIG. 5. The "path" column displays a file path in which the setup program is stored.

If the user presses an "uninstallation" button in any of the rows, the setup program of the selected row is uninstalled.

Figure 6:
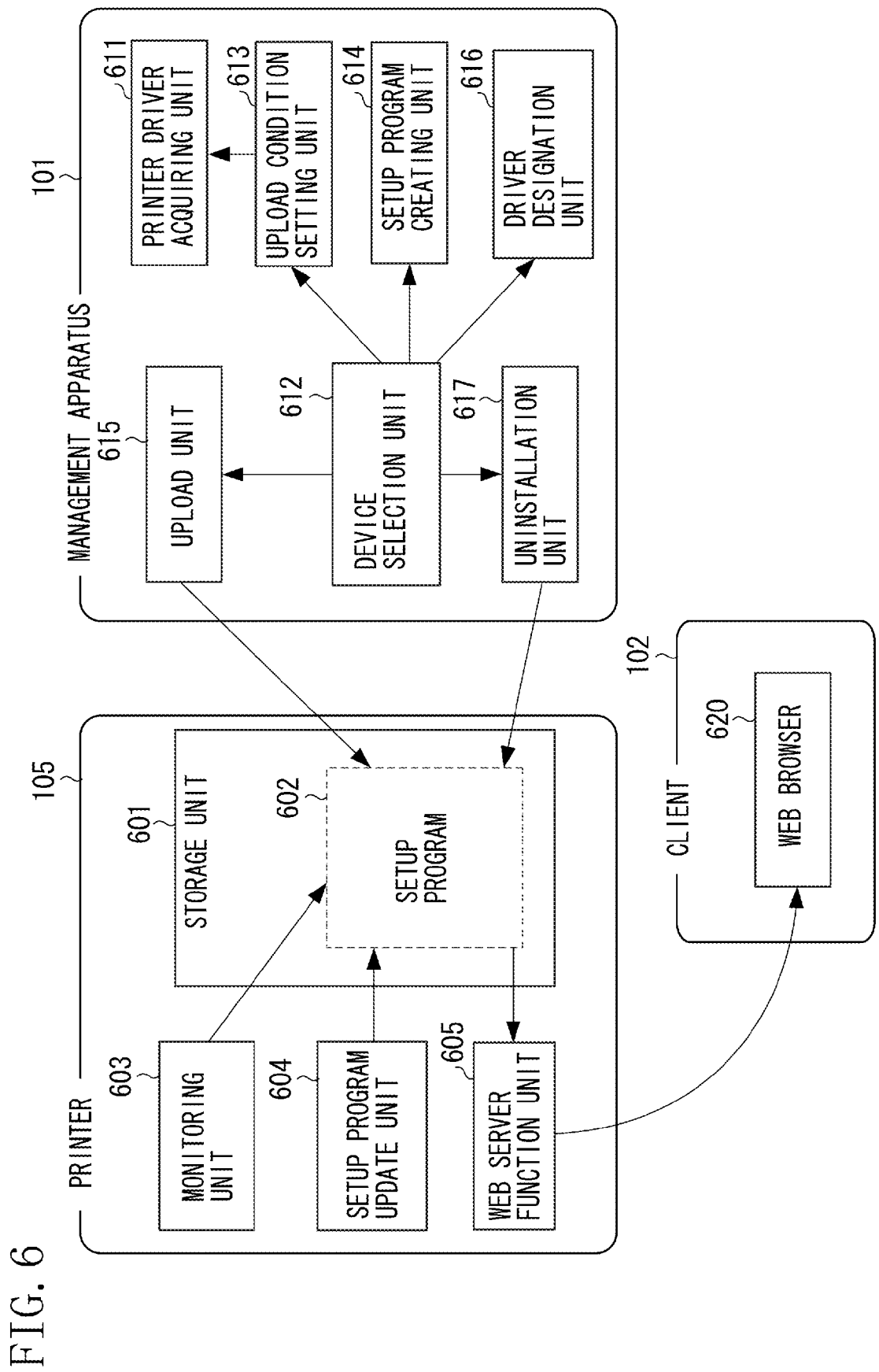
FIG. 6 illustrates an example of a system configuration according to the exemplary embodiment of the present invention.

FIG. 6 illustrates a main modular configuration in the printing system according to the present exemplary embodiment. These modules have a logical configuration for providing functions realized such that the CPU executes the program in each of the apparatuses within the system.

The printer 105 includes a storage unit 601, a monitoring unit 603, a setup program update unit 604 and a Web server function unit 605.

The storage unit 601 receives the setup program from an upload unit 615 of the management apparatus 101 and stores thus received setup program in the storage region preliminary secured in the storage device. The storage unit 601 receives information for identifying the setup program having been stored, as an uninstallation request, from an uninstallation unit 617 of the management apparatus 101 to uninstall the corresponding setup program. The setup program 602 is an execution program including the installer and various types of settings required in creating the logical printer.

The monitoring unit 603 monitors configuration information of the printer 105. If the configuration information of the printer 105 changes, the monitoring unit 603 requests the setup program update unit 604 to update the setup program 602. The configuration information includes information set to the printer 105, e.g., an IP address, a host name, a device name, and location information. The monitoring unit 603 monitors the upload of the setup program and an uninstallation command of the setup program having already been registered from the information processing apparatus 101.

The setup program update unit 604 rewrites internal information of the setup program 602 based on the command from the monitoring unit 603. The Web server function unit 605 works as the Web server. The Web server function unit 605 provides various types of Web pages including the driver download screens illustrated in FIGS. 5 and 24.

The management apparatus 101 includes a printer driver acquiring unit 611, a device selection unit 612, an upload condition setting unit 613, a setup program creating unit 614, the upload unit 615, an driver designation unit 616, and the uninstallation unit 617.

The printer driver acquiring unit 611 is started up from the upload condition setting screen (FIG. 4) to acquire the installer. The device selection unit 612 displays the screen (FIG. 3) provided by the management application on the display unit 207. The upload condition setting unit 613 displays the setting screen (FIG. 4) on the display unit 207. The setup program creating unit 614 acquires setting information necessary for a registration of the logical printer from the upload condition setting unit 613 to the installer acquired by the printer driver acquiring unit 611, and creates the setup program.

The upload unit 615 transmits the setup program to the storage unit 601. The driver designation unit 616 displays the designation screen for designating the driver to be uninstalled illustrated in FIG. 22 on the display unit 207. The uninstallation unit 617 acquires the upload number storing the setup program to be uninstalled from the driver designation unit 616. Further, the uninstallation unit 617 makes a request for uninstalling the setup program corresponding to the upload number from the storage unit 601.

The client 102 includes the Web browser 620 and accesses the Web server of the printer 105 according to an instruction from the user to perform, for example, the download of the setup program 602.

Processing performed by the device selection unit 612 is described below with reference to the flow chart in FIG. 7. A program to be used in the present processing is preliminary installed in the HD 205 of the management apparatus 101 and is called by the RAM 202 to be executed by the CPU 200. It is assumed that the devices registered in the screen illustrated in FIG. 3 are all printers.

In step S701, the device selection unit 612 confirms whether an event occurs. For example, in a method discussed in the MSDN Library (registered trademark) of the Microsoft Corporation, operations of a click by a mouse and the input using the keyboard and an ID for uniquely determining the respective resources such as the buttons and the list boxes within a window are notified as the event. If the device selection unit 612 determines that no event occurs (NO in step S701), the processing in step S701 is repeated.

In step S701, if the device selection unit 612 determines that the event occurs (YES in step S701), then in step S702, the device selection unit 612 determines whether the event is the selection of the device. In other words, if the occurred event includes the ID indicated by a record of the device list on the device selection screen illustrated in FIG. 3 and an operation of the left button of the mouse, the device selection unit 612 determines that the "device selection" is performed.

In step S702, if the device selection unit 612 determines that the event is the device selection (YES in step S702), in step S703, the device selection unit 612 adds the record to a list of devices stored in the work area preliminary secured in the storage device, e.g., the RAM 202 and the HD 205. The list of devices includes information unique to the printer 105 such as a device model name, an IP address, and a serial number. Then, the processing returns to step S701.

In step S702, if the device selection unit 612 determines that the event is not the device selection (NO in step S702), in step S704, the device selection unit 612 determines whether the event is a press of the "registration of driver" button. More specifically, if the event includes an ID indicating the "registration of driver" button on the device selection screen illustrated in FIG. 3 and an operation of the left button of the mouse, the device selection unit 612 determines that the event is the press of the "registration of driver" button.

In step S704, if the device selection unit 612 determines that the event is the press of the "registration of driver" button (YES in step S704), then in step S705, the device selection unit 612 passes the device list created in step S703 to the upload condition setting unit 613. The upload condition setting unit 613 after receiving the device list performs the below described setting of the upload condition.

In step S706, the device selection unit 612 passes the device list, the installer acquired by the printer driver acquiring unit 611, and the upload condition set in step S705 to the upload unit 615. The upload unit 615 performs the below described upload processing. Then, the processing returns to step S701.

In step S704, if the device selection unit 612 determines that the event is not a press of the "registration of driver" button (NO in step S704), in step S707, the device selection unit 612 determines whether the event is a press of the "uninstallation of driver" button. More specifically, if the event includes an ID indicating the "uninstallation of driver" button on the device selection screen illustrated in FIG. 3 and the operation of the left button of the mouse, the device selection unit 612 determines that the event is the press of the "uninstallation of driver" button.

In step S707, if the device selection unit 612 determines that the event is the press of the "uninstallation of driver" button (YES in step S707), then in step S708, the device selection unit 612 performs the below described designating processing of the driver to be uninstalled. In step S709, the device selection unit 612 acquires information about the driver to be uninstalled designated in step S708 and passes thus acquired information to the uninstallation unit 617. The uninstallation unit 617 performs the below described driver uninstallation processing. Then, the processing returns to step S701.

In step S707, if the device selection unit 612 determines that the event is not the press of the "uninstallation of driver" button (NO in step S707), in step S710, the device selection unit 612 determines whether the event is an "end". More specifically, if the event includes an ID indicating an "end" icon on the device selection screen illustrated in FIG. 3 and the operation of the left button of the mouse, the device selection unit 612 determines that the event is the press of the end icon (YES in step S710) and thus determines that the event is the "end".

In step S710, if the device selection unit 612 determines that the event is the "end", the device selection unit 612 opens the work area secured in the storage device such as the RAM 202 and the HD 205 based on a predetermined procedure to end the processing. In step S710, if the device selection unit 612 determines the event is not the "end" (NO in step S710), the device selection unit 612 determines the other operations are performed. Then, the processing returns to step S701. Descriptions of the other operations are omitted here.

Figure 7:
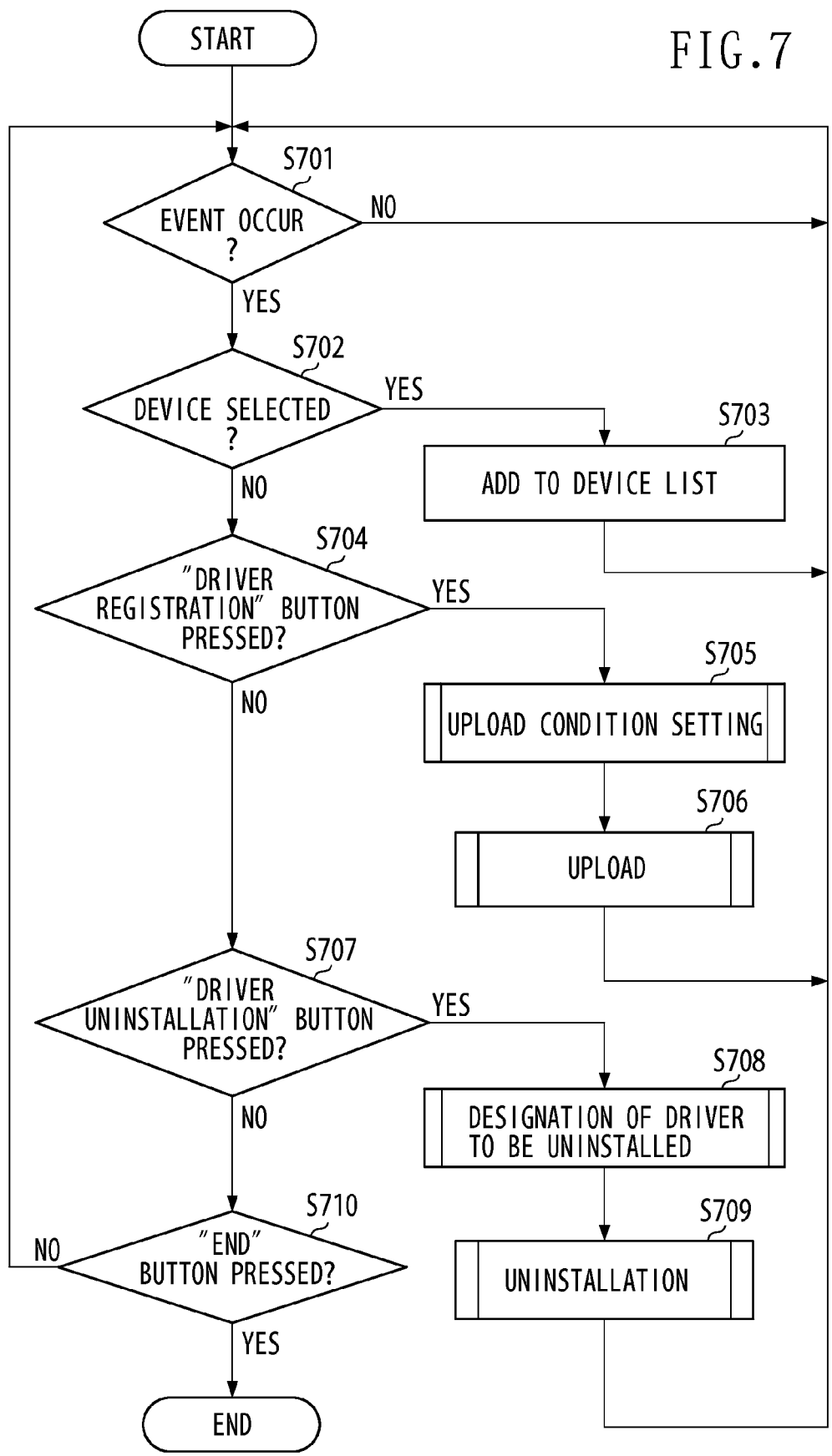
FIG. 7 is a flow chart for illustrating device selection processing according to the exemplary embodiment of the present invention.
Figure 8:
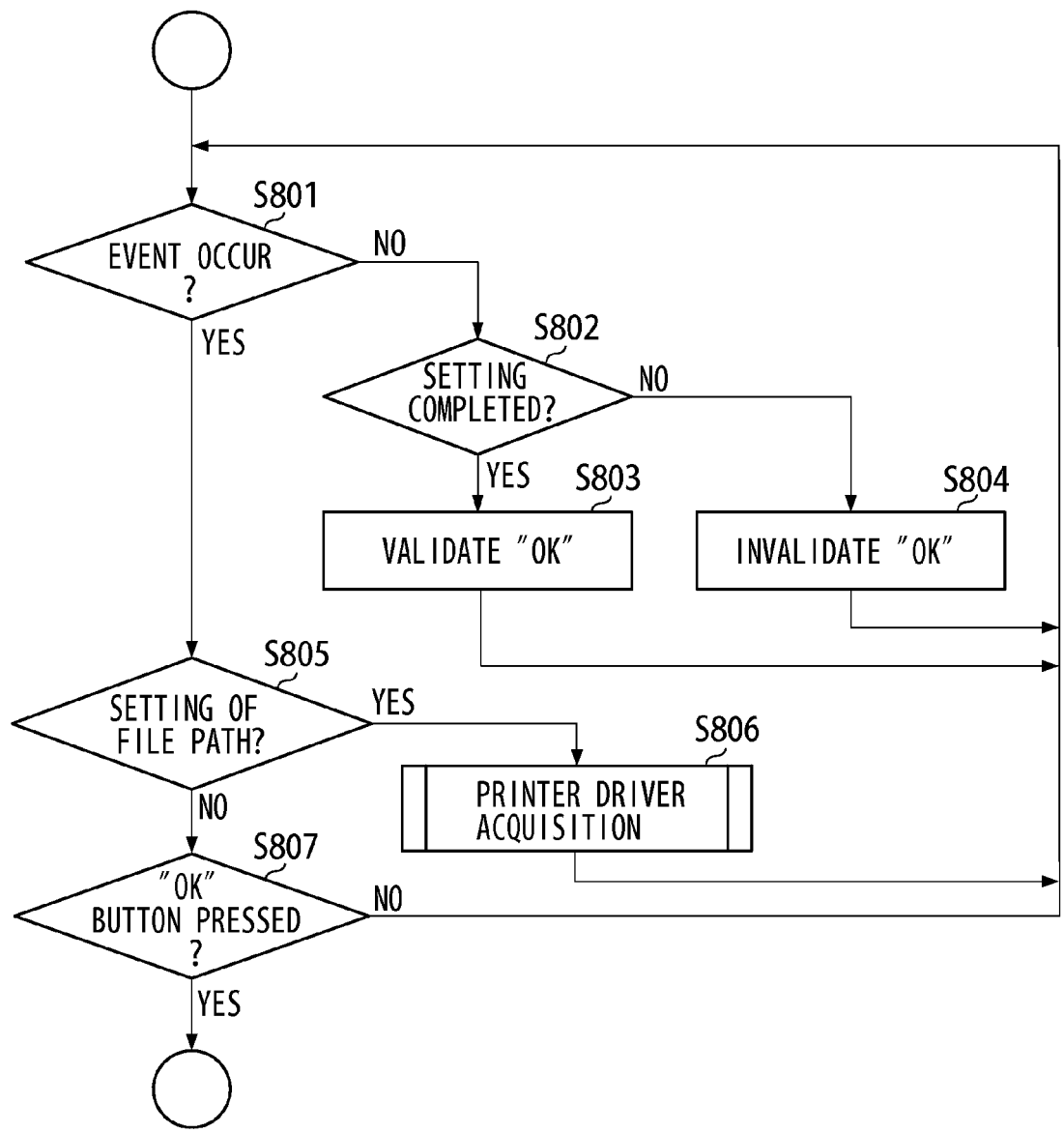
FIG. 8 is a flow chart illustrating upload condition setting processing according to the exemplary embodiment of the present invention.

Setting processing of the upload condition in step S705 in FIG. 7 is described below with reference to FIG. 8. In the present setting processing, the setting screen as illustrated in FIG. 4 is displayed on the display unit.

In step S801, the upload condition setting unit 613 confirms whether the event occurs. In step S801, if the upload condition setting unit 613 determines that the event does not occur (NO in step S801), then in step S802, the upload condition setting unit 613 determines whether the setting is completed. More specifically, the upload condition setting unit 613 searches the setting screen of the upload condition illustrated in FIG. 4 and, if values are already set in all items, the upload condition setting unit 613 determines that the setting is completed.

In step S802, if the upload condition setting unit 613 determines that the setting is completed (YES in step S802), in step S803, the upload condition setting unit 613 validates an "OK" button on the setting screen illustrated in FIG. 4. Then, the processing returns to step S801. In step S802, if the upload condition setting unit 613 determines that the setting is not completed (NO in step S802), in step S804, the upload condition setting unit 613 invalidates the "OK" button of the setting screen illustrated in FIG. 4. Then, the processing returns to step S801.

In step S801, if the upload condition setting unit 613 determines that the event occurs (YES in step S801), then in step S805, the upload condition setting unit 613 determines whether the event is the setting of a file path. More specifically, if the event includes an ID indicating a "reference"

button of the setting screen illustrated in FIG. 4 and the operation of the left button of the mouse, the upload condition setting unit 613 determines that the event is the "setting of the file path" (YES in step S805). Then, the processing proceeds to step S806. In step S806, the upload condition setting unit 613 calls the printer driver acquiring unit 611. The printer driver acquiring unit 611 performs the below described printer driver acquiring processing. Then, the processing returns to step S801.

In step S805, if the upload condition setting unit 613 determines that the event is not the setting of the file path (NO in step S805), in step S807, the upload condition setting unit 613 determines whether the event is a press of the "OK" button. More specifically, if the event includes an ID indicating the "OK" button of the setting screen illustrated in FIG. 4 and the operation of the left button of the mouse, the upload condition setting unit 613 determines the "OK" button is pressed. In step S807, if the upload condition setting unit 613 determines that the event is not the press of the "OK" button (NO in step S807), the processing returns to step S801. In step S807, if the upload condition setting unit 613 determines that the event is the press of the "OK" button (YES in step S807), the upload condition setting unit 613 returns the upload condition set on the setting screen to the device selection unit 612, and ends the setting processing.

Figure 9:
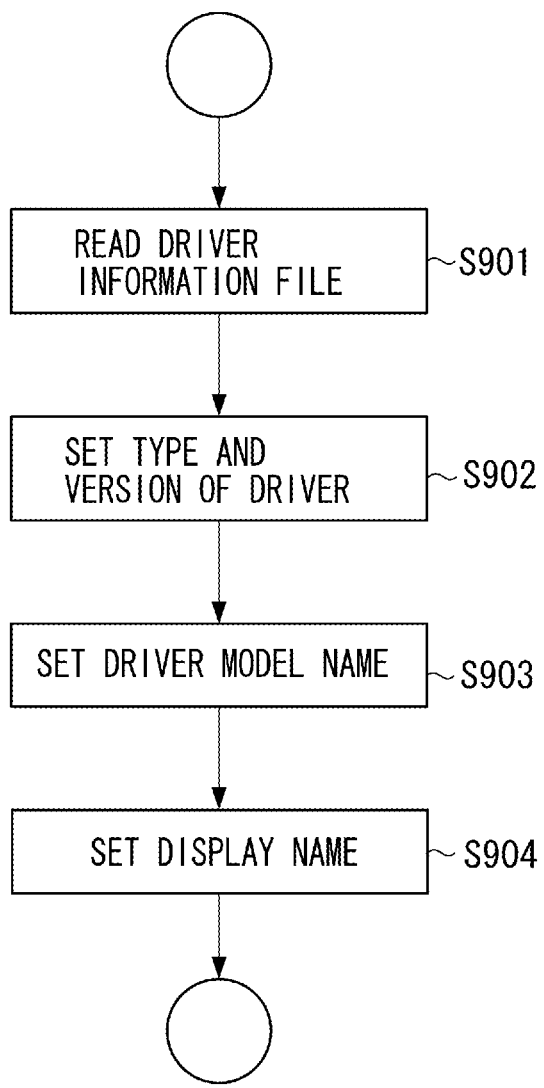
FIG. 9 is a flow chart illustrating printer driver acquiring processing according to the exemplary embodiment of the present invention.

The printer driver acquiring processing in step S806 is described below with reference to FIG. 9.

In step S901, the printer driver acquiring unit 611 reads a driver information file. The printer driver acquiring unit 611 acquires path information of a "setup.exe" file designated by the user from a file selection dialog (not illustrated) and searches the driver information file (i.e., setup.inf) equal to or lower than the path by the CPU 200. If the driver information file is found, the printer driver acquiring unit 611 searches the file according to a predetermined format to read the version information and the driver type. Then, the printer driver acquiring unit 611 stores them in a predetermined work area of the storage device such as the RAM 202.

In step S902, the printer driver acquiring unit 611 writes the version information and the driver type acquired in step S901 into the "version:" text area and the "driver type:" text area, respectively, in the setting screen (FIG. 4) of the upload condition displayed on the display unit.

In step S903, the printer driver acquiring unit 611 sets a driver model name. The printer driver acquiring unit 611 searches the driver information file for the driver model name suitable for the device. For example, in the MSDN Library (registered trademark) of the Microsoft Corporation, a method is discussed in which the driver model name and a hardware ID are described as a single entry in a model section of an INF file.

According to the description, the printer driver acquiring unit 611 searches all the descriptions identical to the hardware ID stored in the device from the driver information file found in step S901. Thus found driver model name is registered into an entry of a list in the "driver model name" combo box of the upload condition setting screen (FIG. 4) displayed on the display unit. On the screen, the driver model name as a leading candidate of the list is set to a selectable state. If the driver model name is not found, all the driver model names described in the driver information file are registered into the entry of the list in the "driver model name" combo box. In this case, in an initial state, the "driver model name" combo box is displayed in the display screen in a state that no driver model is selected.

It is assumed that the driver model name used in the present step is set to a driver model name of the leading device selected from the device list displayed by the management application in FIG. 3. In step S904, the printer driver acquiring unit 611 sets the information of the "driver model name" combo box set in step S903 to a display name text box. Then, the present processing is ended.

Figure 10:
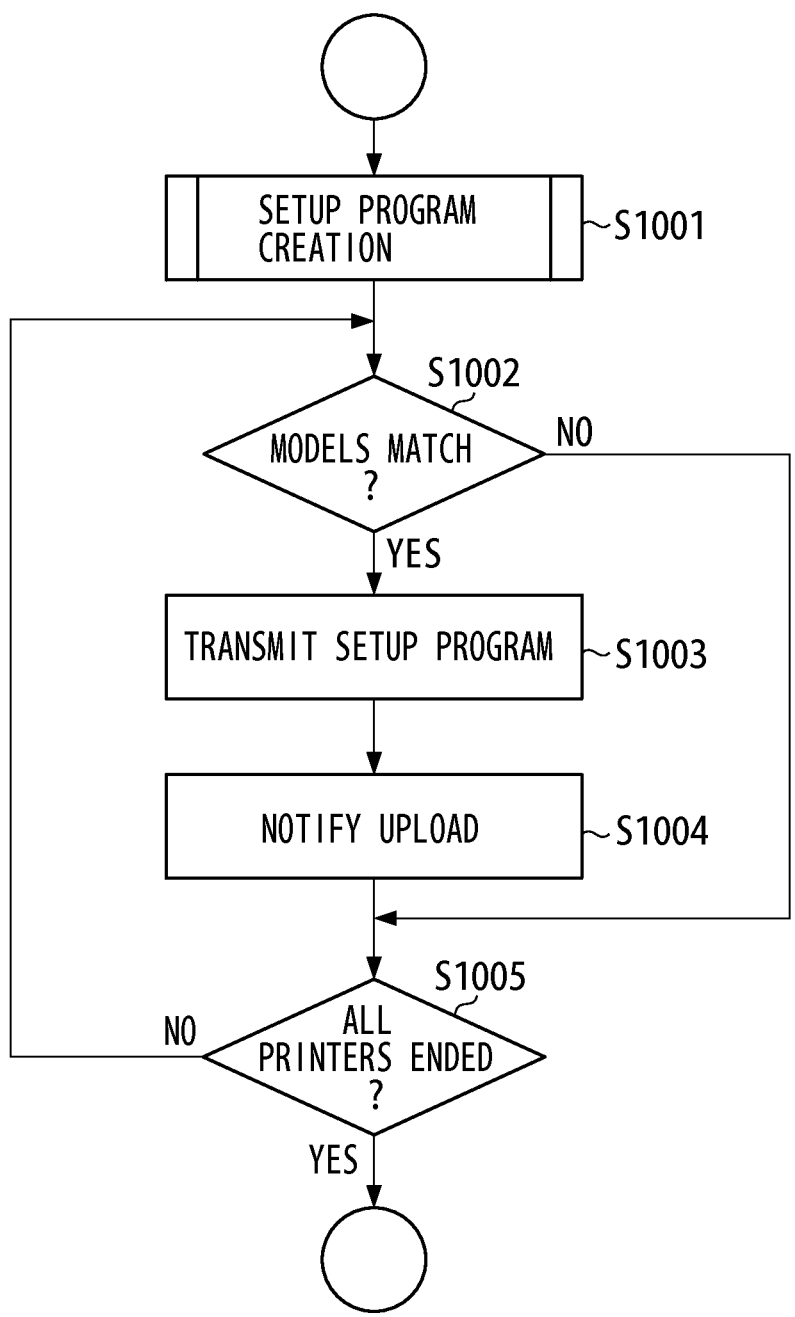
FIG. 10 is a basic flow of upload processing according to the exemplary embodiment of the present invention.
Figure 11:
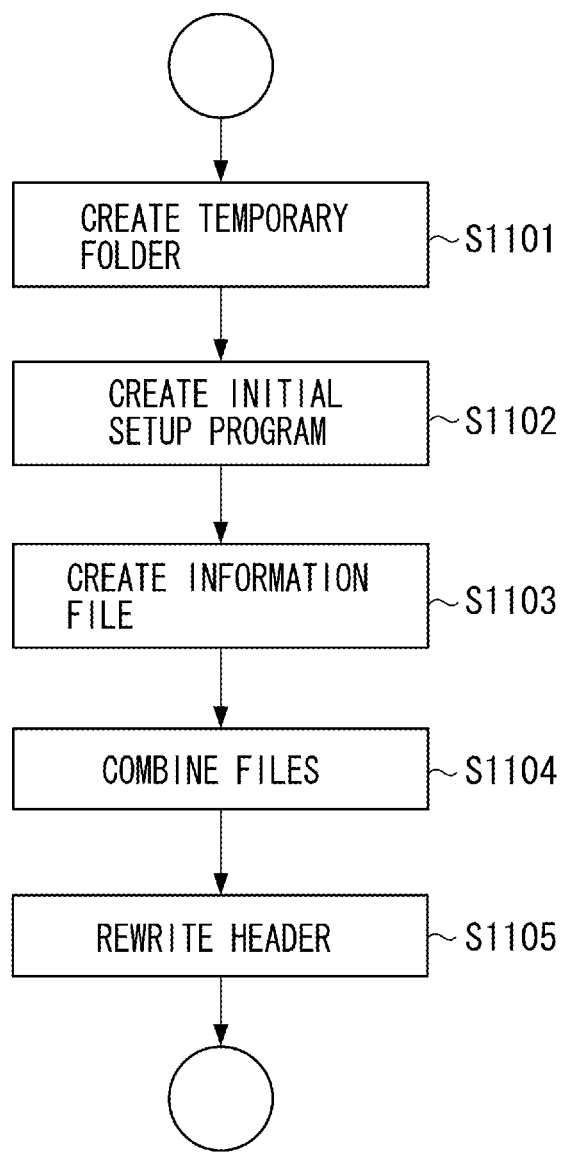
FIG. 11 is a flow chart for illustrating setup program creating processing according to the exemplary embodiment of the present invention.

The upload processing of the setup program in step S706 is described below with reference to FIG. 10. It is assumed that the information required for the listing and the uploading of the devices to be uploaded are passed from the device selection unit 612 to the upload unit 615 and stored in the work area secured in the storage area such as the RAM 202.

In step S1001, the upload unit 615 calls the setup program creating unit 614 and passes the necessary information and the installer to be uploaded. The setup program creating unit 614 performs the below described setup program creating processing.

In step S1002, the upload unit 615 determines whether the model names match to each other. In other words, the upload unit 615 extracts a single record from the device list stored in the work area secured in the storage area such as the RAM 202. Then, the model name of the device within the extracted record is compared with the model name of the driver of the setup program created by the below described setup program creating unit 614. If the comparison result shows matching, the upload unit 615 determines that the model names match to each other. For example, when the model name of the device is "C_iR-ADV C5051", and the device model name is included therein in a similar manner as the driver model name of "C_iR-ADV C5051/5041", the upload unit 615 determines that the driver model names match to each other.

In step S1002, if the upload unit 615 determines that the model names match to each other (YES in step S1002), then in step S1003, the upload unit 615 transmits the setup program. More specifically, the upload unit 615 locates the setup program created by the below described setup program creating unit in the storage unit 601 of the printer 105 according to a setting value of the upload condition setting screen (FIG. 4).

In step S1004, the upload unit 615 notifies the printer 105 of the upload of the setup program. In other words, the upload unit 615 notifies the printer 105 of an upload number, a path, a file name, and information required for creating the download page stored in the printer based on a predetermined procedure with using a preliminary prepared communication unit.

In step S1005, the upload unit 615 determines whether processing is ended with respect to all the devices. In other words, the upload unit 615 searches the list of the devices stored in the work area secured in the storage area such as the RAM 202 and, if there is no unprocessed record, the upload unit 615 determines that the processing is ended with respect to all the devices. In step S1005, if the upload unit 615 determines that the processing is ended with respect to all the devices (YES in step S1005), the upload unit 615 ends the upload processing. In step S1005, if the upload unit 615 determines that processing is not ended with respect to all the devices (NO in step S1005), the processing returns to step S1002 and the same processing is performed with respect to the other devices. In step S1002, if the upload unit 615 determines that the model names do not match to each other (NO in step S1002), the processing proceeds to step S1005.

The setup program creating processing in step S1001 is described below with reference to FIG. 11 and FIGS. 15 through 17. It is assumed that the information necessary for creating the setup program and the installer are passed from the upload unit 615, as required.

In step S1101, the setup program creating unit 614 creates a temporary folder. For example, the setup program creating unit 614 creates a folder in the work area secured in the storage area such as the RAM 202 and the HD 205 by using a function provided by the OS.

Figure 15A:
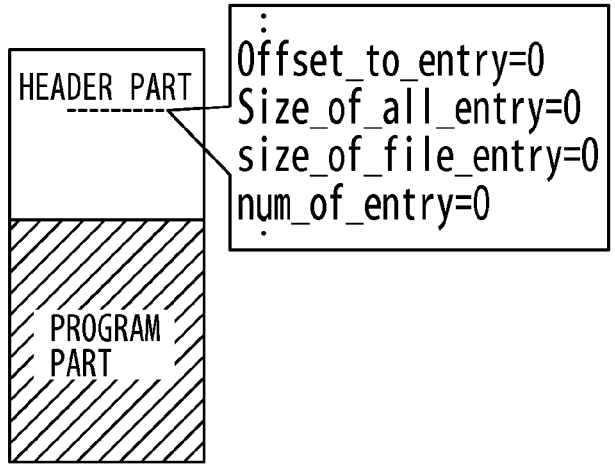
FIGS. 15A and 15B, respectively, are a configuration diagram of the setup program before and after combining an installer according to the exemplary embodiment of the present invention.

In step S1102, the setup program creating unit 614 creates an initial setup program illustrated in FIG. 15A in the temporary folder created in step S1101. The initial setup program includes a header part and a program part.

The header part stores various parameters for determining operations of the program part. Examples of the parameter include the following ones.

Offset_to_entry: an offset from a head where an area for storing information about a combine file is stored Size_of_all_entry: a total capacity of an area storing the information about the combine file size_of_file_entry: a capacity of the area storing the information about the combine file num_of_entry: a total number of the areas storing the information about the combine file In the initial setup program, since there is no combine file, the above described parameter is set to zero. The program part stores a program for identifying a location of the combine file with reference to the header part, separating the combined installer, and starting up the installer.

Figure 17A:

In step S1103, the setup program creating unit 614 creates an information file illustrated in FIGS. 16A and 17A in the temporary folder created in step S1101. FIG. 16A illustrates a file named of "setup.ini" that includes information necessary for starting up the setup program and information necessary for creating the below described download page.

The "setup.ini" file includes a [DriverUploadInfo] section and can make the following settings.

DriverModelName: a driver model name

PrinterName: a name of a logical printer to be installed in a PC

Comments: a comment to be set in the logical printer installed in the PC

PortType: a port type (1: IP address, 2: host name, 3: port name)

PortName: a port name (valid only in a case of PortType=3)

An example in FIG. 16A shows that the driver model is "C_iR-ADV C5045/5051", the name of the logical printer is "C_iR-ADV C5051", the comment is "3F share printer", and the port type is "1" that means the IP address.

FIG. 17A illustrates a file named of "silent.ini" that includes information required by the installer separated from the combined setup program. The "silent.ini" file includes sections of [InstallComplete], [SelectJob], and [PrinterInfo] and can set the following settings.

Reboot: a flag for controlling a reboot of a PC after completing the installation (0: no reboot, 1: reboot)

SelectJob: an installation mode of a printer driver (0: new installation, 1: overwriting installation, 2: no installation)

PRT1: designate a name of the logical printer, a driver model, and a connection port In an example of FIG. 17A, no reboot and overwriting installation are designated. In an initial state, the name of the logical printer, the driver model, and the connection port are not set yet. These items which are not set yet are set in the below described setup program updating processing.

In step S1104, the setup program creating unit 614 combines the information file created in step S1103 and the installer acquired in step S806 with the initial setup program created in step S1102.

Figure 15B:
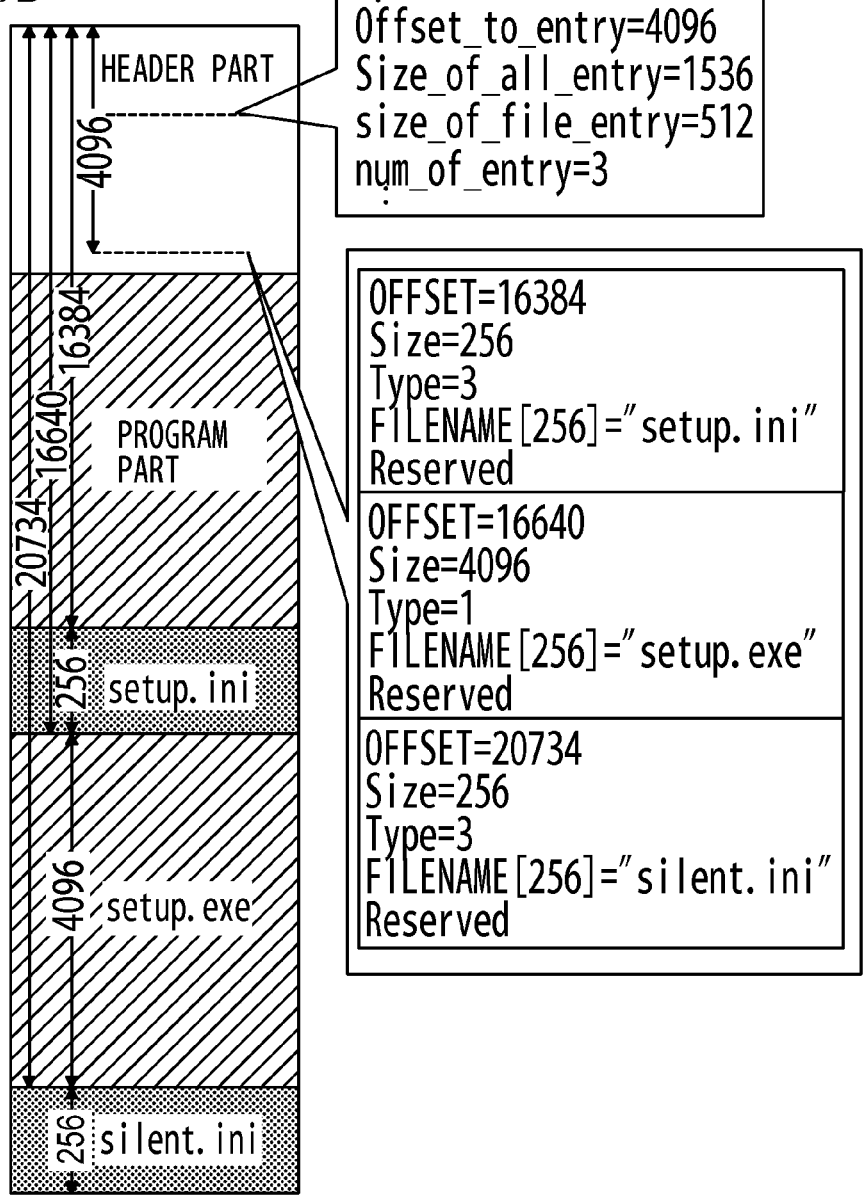

In step S1105, the setup program creating unit 614 rewrites the header part of the setup program created in step S1104 and creates a setup program illustrated in FIG. 15B. In the "Offset_to_entry" of the header part, an offset of "4096" from a head of the setup program of the area storing information about the combine file is set. In the "Size_of_all_entry" of the header part, a total capacity of "1536" of the area storing the information about the combine file is set. In the "size_of_file_entry" of the header part, a capacity "512" of the area storing the information about the combine file is set. In the "num_of_entry" of the header part, a total number "3" of the area storing the information about the combine file is set.

Three areas storing the information about the combine file are secured in an area designated by the "Offset_to_entry". The information about the combine file is stored in the three areas. The three areas include the "setup.ini" file created in step S1103, the installer acquired by the printer driver acquiring unit 611 and passed from the upload unit 615, and the "silent.ini" file created in step S1103 in this order from the beginning.

The following pieces of information about the respective files are set in the respective areas.

OFFSET: an offset from the head of the setup program where the combined file is located Size: a size of the combined file Type: type of the combined file (1: execution file, 2: temporary file, 3: information file, and 4: others)

FILENAME: a name of the combined file

The setup program creating unit 614 ends the setup program creating processing after the header part of the setup program is rewritten.

Figure 12:
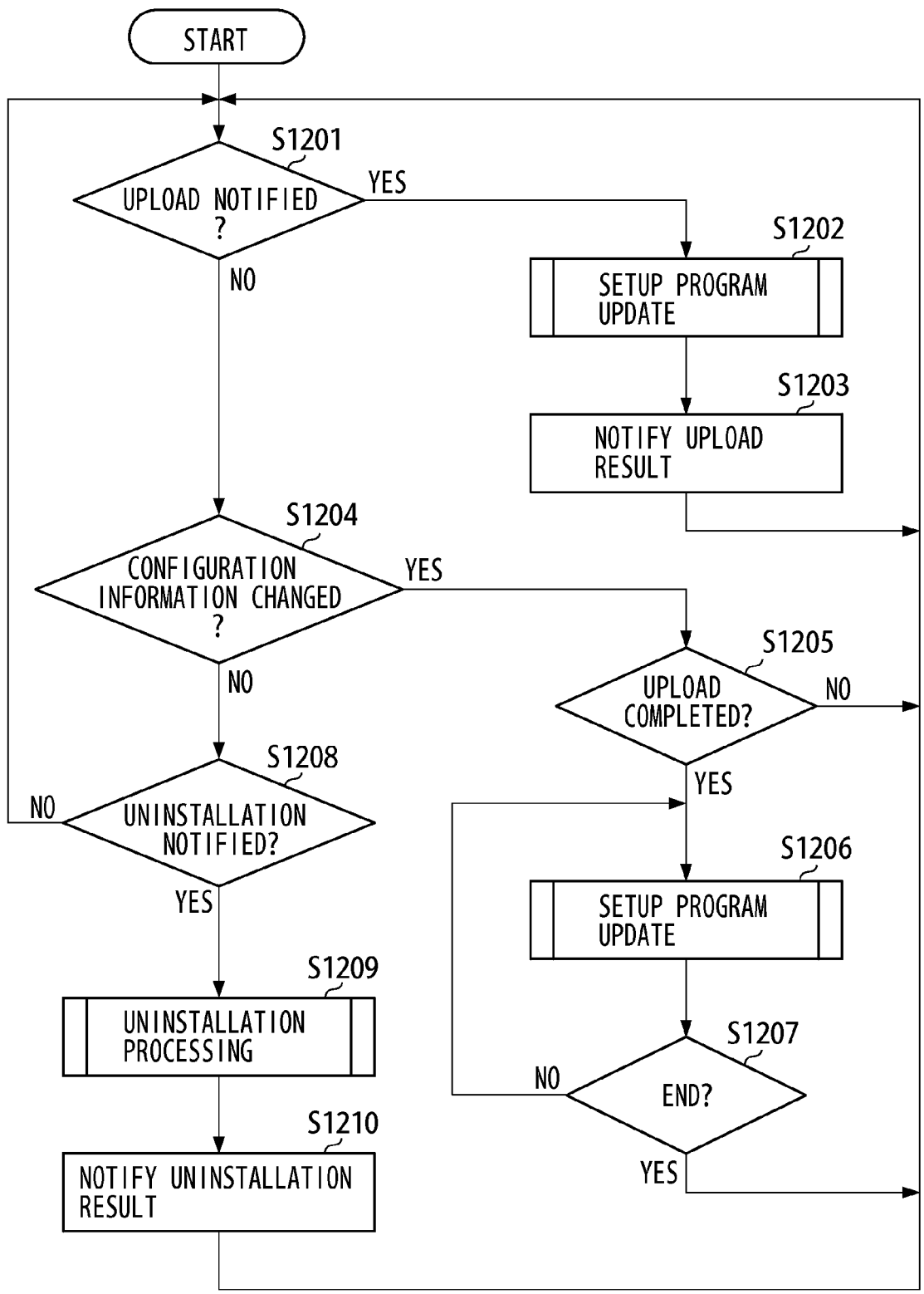
FIG. 12 is a flow chart illustrating monitoring processing according to the exemplary embodiment of the present invention.

Processing performed by the monitoring unit 603 of the printer 105 is described below with reference to FIG. 12. It is assumed that the monitoring unit 603 is started up together with the startup of the printer 105 and is continuously operated until the printer 105 stops operating.

In step S1201, the monitoring unit 603 determines whether the upload of the setup program is notified from the management apparatus 101. In other words, when the monitoring unit 603 searches for a packet received through the connection unit 226 via the bidirectional interface 209 based on a predetermined procedure and finds the notification of the upload with a predetermined format, the monitoring unit 603 determines that the upload is notified.

In step S1201, if the monitoring unit 603 determines that the upload is notified (YES in step S1201), then in step S1202, the monitoring unit 603 calls the setup program update unit 604. At the same time, the monitoring unit 603 passes the below described configuration information and a registration command to the setup program update unit 604 in addition to the upload number, the path, the file name acquired from the notification of the upload, and the information necessary for creating the download page. The setup program update unit 604 performs the updating processing of the below described setup program.

In step S1203, the monitoring unit 603 issues an upload result notification. In step S1201, the monitoring unit 603 transmits the upload result notification created with a predetermined format to the transmission source (i.e., the management apparatus 101) of the upload notification via the connection unit 226 based on a predetermined method. Then, the processing returns to step S1201.

In step S1201, if the monitoring unit 603 determines that the upload is not notified (NO in step S1201), in step S1204, the monitoring unit 603 determines whether there is a change in the configuration information. In other words, the monitoring unit 603 sequentially reads out the configuration information stored in a specific area of the storage device such as the PRAM 222 and, if there is a change in comparison with the prior determination, the monitoring unit 603 determines that there is the change in the configuration information. If there is the change in the configuration information (YES in step S1204), the configuration information is stored in a preliminary prepared work area of the storage device such as the PRAM 222 as a comparison target for the next determination. Examples of the configuration information include the IP address and the device name that can be changed by the administrator.

In step S1204, if the monitoring unit 603 determines that there is the change in the configuration information (YES in step S1204), then in step S1205, the monitoring unit 603 determines whether the setup program is uploaded. If the setup program is uploaded from the management apparatus 101, the monitoring unit 603 reads out management information from an area preliminary prepared in the storage device such as the HD 228 into which the upload of the setup program from the management apparatus is to be written as the management information. As a result of reading out of the management information, if one or more pieces of information of the setup program exists, the monitoring unit 603 determines that the setup program is uploaded from the management apparatus 101. In step S1205, if the monitoring unit 603 determines that there is no uploaded setup program (NO in step S1205), the processing proceeds to step S1201.

In step S1205, if the monitoring unit 603 determines the setup program is already uploaded (YES in step S1205), then in step S1206, the monitoring unit 603 calls the setup program update unit 604. At the same time, the monitoring unit 603 reads out a piece of information about the setup program which is not yet updated from the management information of the above described setup program. The monitoring unit 603 passes an update command and the configuration information acquired in step S1204 to the setup program update unit 604 in addition to the upload number, the path, and the file name thus read out, and the information necessary for creating the download page. The setup program update unit 604 performs the updating processing of the below described setup program.

In step S1207, the monitoring unit 603 determines whether the updating processing is ended with respect to all the setup programs having been uploaded from the management apparatus 101. More specifically, the monitoring unit 603 searches for the management information about the above described setup program and, if there is no setup program which is not updated, the monitoring unit 603 determines that the updating processing is ended with respect to all the setup programs. In step S1207, if the monitoring unit 603 determines that the updating processing is not ended (NO in step S1207), the processing returns to step S1206. In step S1207, if the monitoring unit 603 determines that the updating processing is ended (YES in step S1207), the processing returns to step S1201.

In step S1204, if the monitoring unit 603 determines that there is no change in the configuration information (NO in step S1204), then in step S1208, the monitoring unit 603 determines whether the uninstallation is notified. More specifically, if the monitoring unit 603 searches for a packet received through the connection unit 226 via the bidirectional interface 209 based on a predetermined procedure and finds the uninstallation notification with a predetermined format, the monitoring unit 603 determines that the uninstallation is notified from the management apparatus 101. If the monitoring unit 603 searches for a notification from the Web server function unit 605 based on a predetermined procedure and finds the uninstallation notification, the monitoring unit 603 determines that the uninstallation is notified from the Web server function unit 605.

In step S1208, if the monitoring unit 603 determines that the uninstallation is notified (YES in step S1208), in step S1209, the monitoring unit 603 calls the setup program update unit 604. At the same time, the monitoring unit 603 passes the upload number acquired from the uninstallation notification and an uninstallation command to the setup program update unit 604. The setup program update unit 604 performs the updating processing with respect to the below described setup program.

In step S1210, the monitoring unit 603 notifies the uninstallation result. More specifically, the monitoring unit 603 transmits the uninstallation result notification created with a predetermined format to the transmission source (i.e., management apparatus 101) of the uninstallation notification determined in step S1208 via the connection unit 226 based on a predetermined method. Then, the processing returns to step S1201. In step S1208, if the monitoring unit 603 determines that the uninstallation is not notified (NO in step S1208), the processing returns to step S1201.

Figure 13:
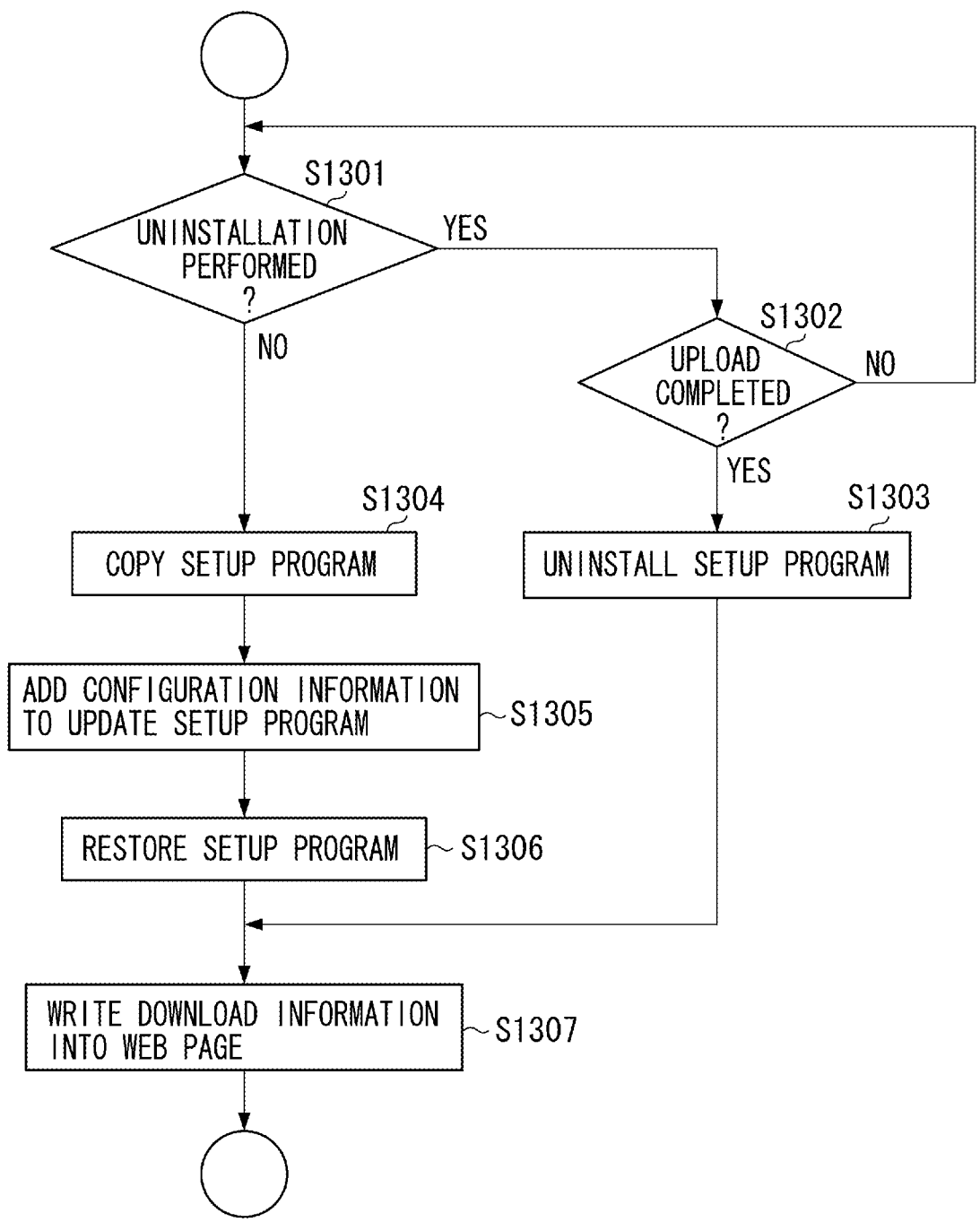
FIG. 13 is a flow chart illustrating setup program updating processing according to the exemplary embodiment of the present invention.

Update processing of the setup program by the setup program update unit 604 of the printer 105 is described below with reference to FIG. 13. Information pieces used in the updating processing, such as a command (for the update or the uninstallation) from the monitoring unit 603, the upload number, the path, the file name, and the information necessary for creating the download page, are stored in the work area secured in, for example, the PRAM 222. Processing according to the information stored in the work area is described in the present processing.

In step S1301, the setup program update unit 604 determines whether the notified command is the uninstallation command. In other words, the setup program update unit 604 searches information in the work area received from the monitoring unit 603 and, if the information includes the uninstallation command, the setup program update unit 604 determines that the uninstallation command is issued.

In step S1301, if the setup program update unit 604 determines that the uninstallation command is issued (YES in step S1301), then in step S1302, the setup program update unit 604 determines whether the setup program is uploaded to the upload number designated by the uninstallation command. In other words, the setup program update unit 604 searches the information in the work area and extracts the upload number therefrom. Then, if the setup program corresponding to the extracted upload number exists in the setup program storage region located in the storage device such as the HD 228, the setup program update unit 604 determines that the upload is completed.

In step S1302, if the setup program update unit 604 determines that the upload is already completed (YES in step S1302), in step S1303, the setup program update unit 604 uninstalls the corresponding setup program stored in the setup program storage region located in the storage device such as the HD 228. Then, the processing proceeds to step S1307. In step S1302, if the setup program update unit 604 determines that the upload is not completed yet (NO in step S1302), the processing returns to step S1301.

In step S1301, if the setup program update unit 604 determines that no uninstallation command is issued (NO in step S1301), then in step S1304, the setup program update unit 604 copies the corresponding setup program located in the storage device such as the HD 228 to the work area secured in the storage device such as the PRAM 222.

In step S1305, the setup program update unit 604 causes the configuration information received from the monitoring unit 603 to be reflected to the setup program copied in step S1304. For example, such a case is assumed that information including the port of "IP_172.10.10.10" and the device name of "Color Printer" is reflected. In this case, the "setup.ini" file and the "silent.ini" file combined with the setup program copied in step S1304 are updated and stored, respectively. FIGS. 16B and 17B, respectively, illustrate updated files in which, for example, device name is changed.

In step S1306, the setup program update unit 604 overwrites the setup program updated in step S1305 onto the original file copied in step S1304 and restores the overwritten setup program.

In step S1307, the setup program update unit 604 writes download information into a page. After reading the download information from the Web browser 602 of the client 102, the log-in user displays the screen in FIG. 5 or FIG. 24. Subsequently, the work area is opened and the setup program updating processing is ended. At the same time, the setup program update unit 604 passes the result of the present processing such as the update completion or the uninstallation completion to the monitoring unit 603 in order to notify the external devices of the result of the processing.

Figure 14:
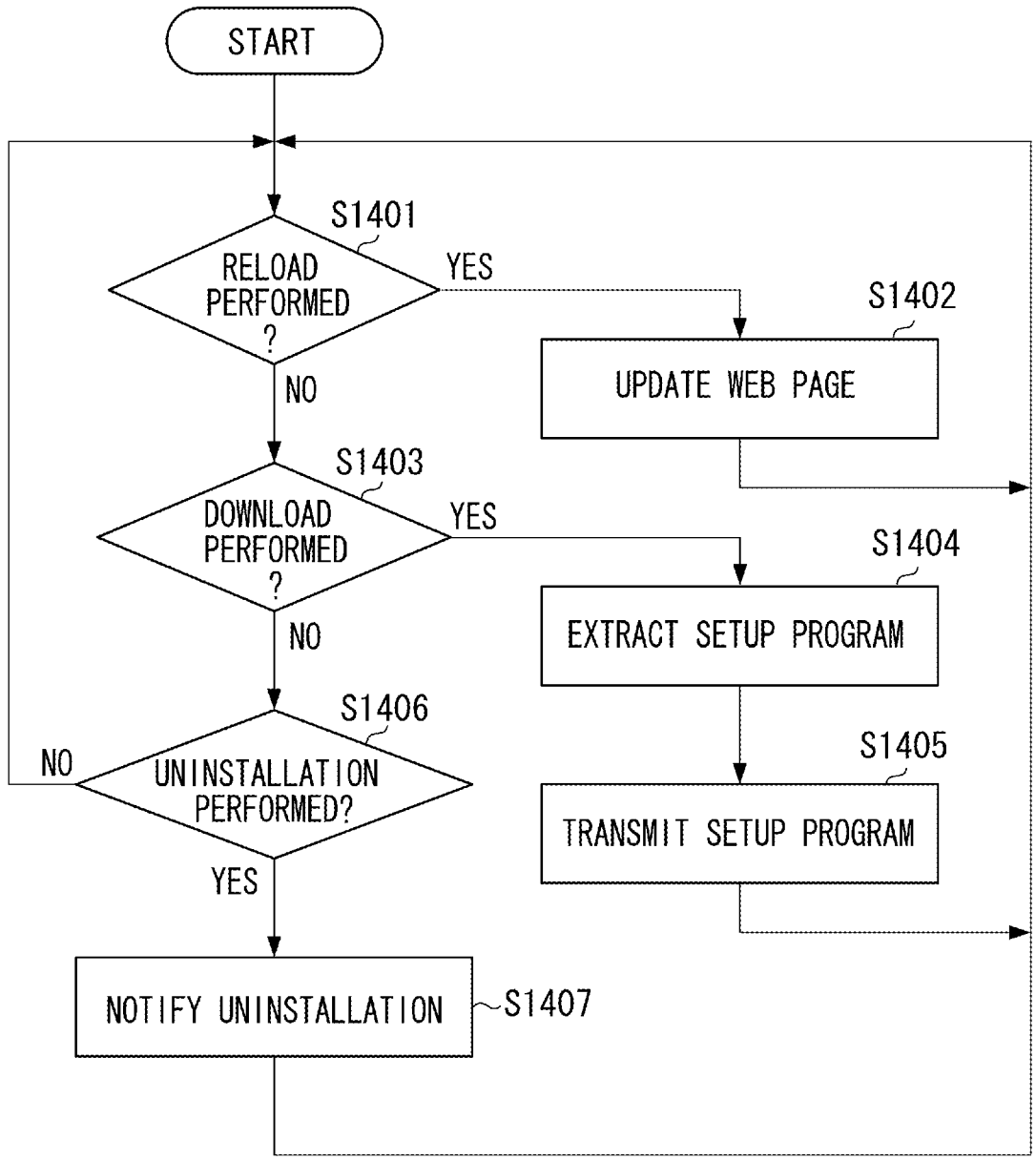
FIG. 14 is a flow chart illustrating Web server processing according to the exemplary embodiment of the present invention.

Processing performed by the Web server function unit 605 of the printer 105 is described below with reference to FIG. 14. In step S1401, the Web server function unit 605 determines whether the user instructs the reload. In other words, the Web server function unit 605 searches for a packet received via the connection unit 226 and determines whether a request for the reload is made from the Web browser 620 or the like. If the request for the reload is found, the Web server function unit 605 determines that the reload is instructed. In step S1401, if the Web server function unit 605 determines that the reload is instructed (YES in step S1401), in step S1402, the Web server function unit 605 rebuilds the page and transmits the rebuilt page to the Web browser 620 based on a predetermined procedure.

In step S1401, if the Web server function unit 605 determines that the reload is not instructed (NO in step S1401), in step S1403, the Web server function unit 605 determines whether the user instructs the download. More specifically, the Web server function unit 605 searches for a packet received via the connection unit 226 and determines whether the request for the download is made. If the request for the download is found, the Web server function unit 605 determines the download is instructed.

In step S1403, if the Web server function unit 605 determines that the download is instructed (YES in step S1403), in step S1404, the Web server function unit 605 extracts the setup program designated in the download request from the storage device such as the HD 228. Then in step S1405, the Web server function unit 605 transmits the setup program extracted in step S1403 to the client 102 which instructs the download of the setup program.

In step S1403, if the Web server function unit 605 determines that the download is not instructed (NO in step S1403), in step S1406, the Web server function unit 605 determines whether the user instructs the uninstallation. More specifically, the Web server function unit 605 searches for the packet received via the connection unit 226 and determines whether the request for the uninstallation is issued. If the Web server function unit 605 finds the request for the uninstallation, the Web server function unit 605 determines the user instructs the uninstallation.

In step S1406, if the Web server function unit 605 determines that the user instructs the uninstallation (YES in step S1406), in step S1407, the Web server function unit 605 notifies the monitoring unit 603 of the uninstallation based on a predetermined procedure. In step S1406, if the Web server function unit 605 determines that the user does not instruct the uninstallation (NO in step S1406), the processing returns to step S1401.

Processing performed by a setup module realized by executing the setup program 602 is described below with reference to FIG. 18. The setup program 602 is downloaded to the client 102 by the user and started up by receiving a command for execution thereof. Upon start-up, the setup program 602 is loaded to the program area secured in the storage device such as the RAM 202 and executed by the CPU 200.

In step S1801, the setup module creates a temporary folder. For example, the setup module uses the function provided by the OS, and creates a folder in the work area secured in the storage area such as the RAM 202 and the HD 205.

In step S1802, the setup module determines whether the folder is successfully created in step S1801. In step S1802, if the setup module determines that the folder is not successfully created (NO in step S1802), the processing proceeds to step S1811 to display an error.

In step S1802, if the setup module determines that the folder is successfully created (YES in step S1802), then in step S1803, the setup module separates the combine files. More specifically, the "silent.ini" file, the "setup.exe" file, and the "setup.ini" file illustrated in FIG. 15B are stored in the temporary folder created in step S1801.

In step S1804, the setup module determines whether the file separation processing in step S1803 is successful. For example, if the setup module determines that the file separation processing is not successful for the reasons that, for example, the temporary folder is inhibited to be written into (NO in step S1804), the processing proceeds to step S1811 to display the error.

In step S1804, if the setup module determines that the file separation processing is successful (YES in step S1804), in step S1805, the setup module extracts the port name from the separated information file. In other words, the setup module extracts the port name described in a PRT column of the "silent.ini" file to store the extracted port name in the predetermined work area in the storage device such as the RAM 202.

In step S1806, the setup module performs the below described determination processing for determining the name of the port to be used.

In step S1807, the setup module updates the "silent.ini" file separated in step S1803. For example, if the setup module determines that the port having a name absent in the port names described in the "silent.ini" file is used in step S1806, the port name described in the PRT column of the "silent.ini" file is changed to the port name acquired in step S1806. When it turns out that a reboot of the PC is required after the installation performed according to the processing not illustrated, an [InstallComplete] section is to be rewritten to "Reboot=1".

In step S1808, the setup module starts up the installer. More specifically, the setup module passes the "silent.ini" file to the installer separated in step S1803 according to, for example, the following command, and starts up the installer.
{setup.exe/s silent.in/log silent.log}
The above command designates the "silent.ini" file as the information file and designates the "silent.log" file as a result storage file.

The installer reads the command in the "silent.ini" file and executes a default action with respect to the items absent in the "silent.ini" file. A result thereof is written into the "silent.log" file.

In step S1809, the setup module determines whether the processing of the installer started up in step S1808 is completed. For example, if a return value of the installer is "0", the setup module determines that the processing is completed, whereas, if a return value of the installer is other than "0", the setup module determines that the processing is completed in error.

In step S1809, if the setup module determines that the processing of the installer is completed (YES in step S1809), then in step S1812, the setup module sets a property of the logical printer. For example, the Win 32 function SetPrinter ( ) prepared in the Windows (registered trademark) of the Microsoft Corporation is used. "Comments" described in the "setup.ini" file separated in step S1803 is designated as the member of "pComment" of a PRINTTER_INO_2 structure of this function.

In step S1809, if the setup module determines that the processing of the installer is not completed (NO in step S1809), then in step S1810, the setup module extracts an error content from the "silent.log" file created by the installer. Then, the processing proceeds to step S1811. In step S1811, the setup module composes an error message, as required, from the error content extracted in step S1810 or error information acquired from the OS. The setup module displays the error message on the display unit 207 and ends the processing.

Figure 18:
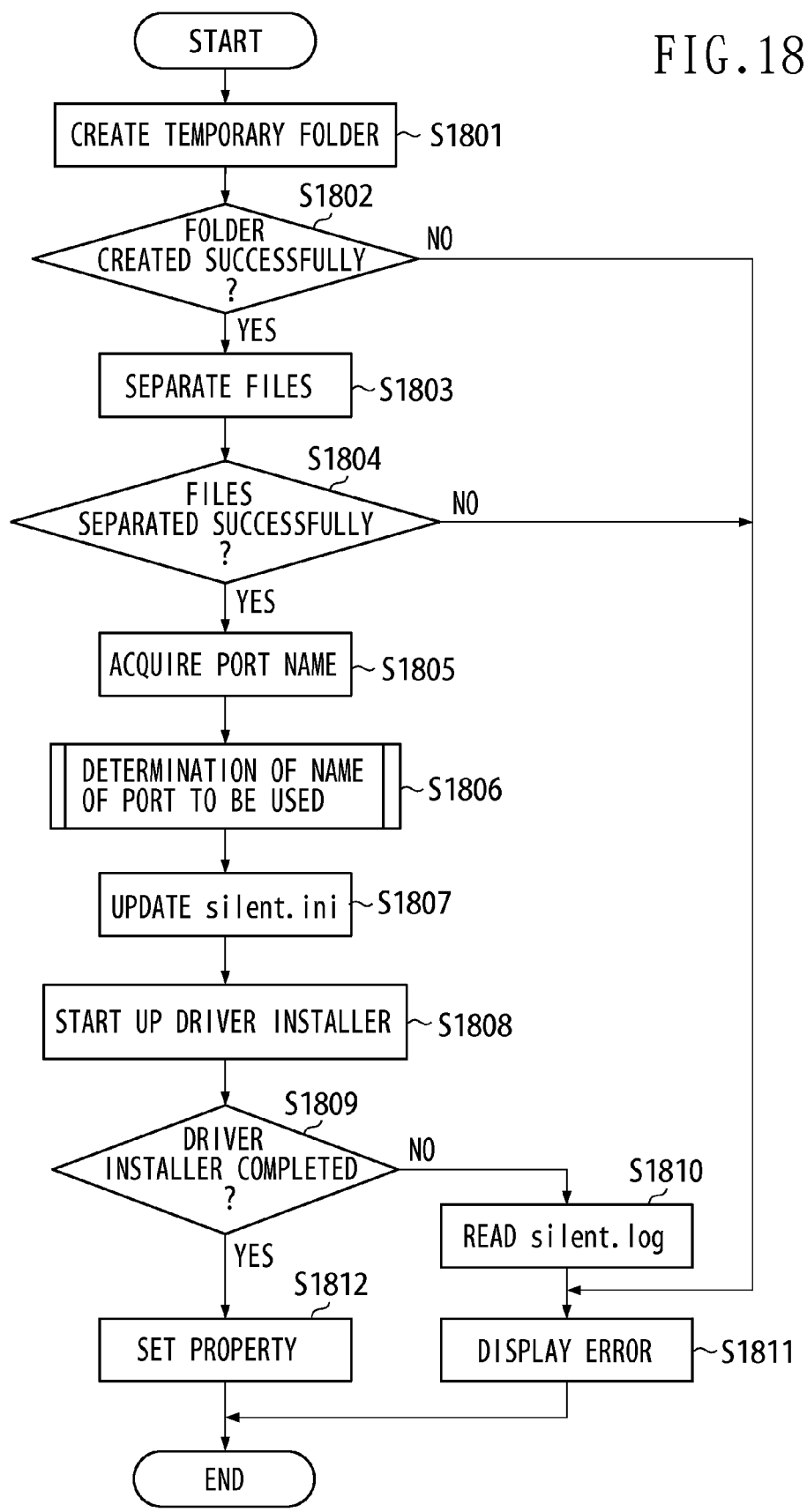
FIG. 18 is a flow chart illustrating processing performed based on the setup program according to a first exemplary embodiment of the present invention.
Figure 19:
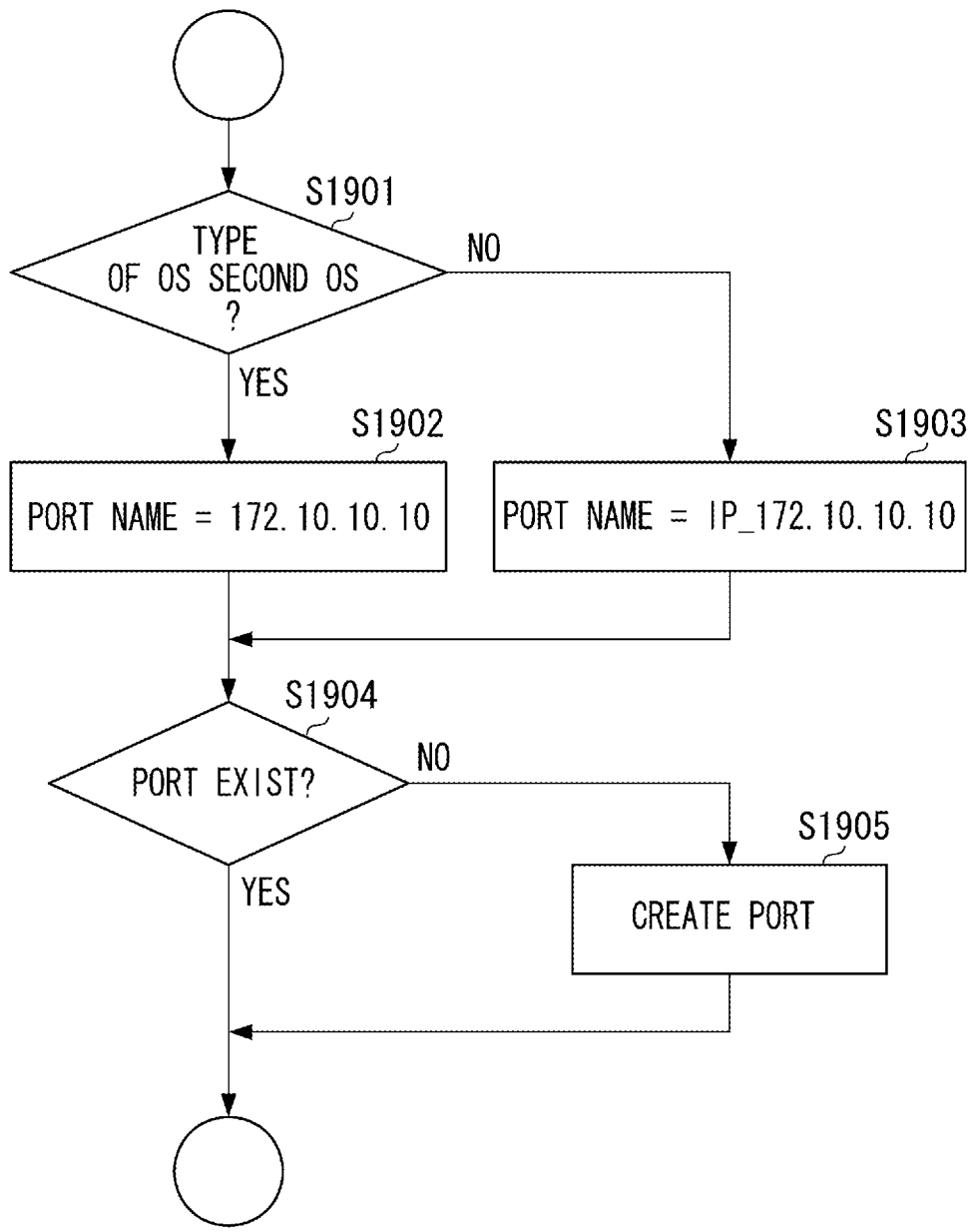
FIG. 19 is a flow chart illustrating determination processing for determining a port name to be used according to the first exemplary embodiment.

The determination processing of the name of the port to be used in step S1806 in FIG. 18 is described below with reference to FIG. 19. The port name described in the "silent.ini" file separated in step S1804 is stored in the predetermined work area of the storage device such as the RAM 202.

As described above, in the standard TCP/IP port included in the OS of the client 102 as standard equipment, the port name to be automatically created differs according to a version of the OS upon installation. For example, as the IP address of the device for executing a print job, a case where the "172.10.10.10" is designated is assumed.

At the time, in a first OS, the "IP_172.10.10.10" is set to the port name as the standard TCP/IP port to create a port. On the other hand, in a second OS, if the same port is created, the port name thereof becomes "172.10.10.10". A specific example of the first OS includes the Windows (registered trademark) XP, whereas a specific example of the second OS includes the Windows (registered trademark) Vista. Processing of the setup module in consideration with these operations in the first OS and the second OS is described below.

In step S1901, the setup module determines an attribute (i.e., a type or a version) of the OS running on the client 102. The setup module determines whether the OS is the second OS or not. For example, if the setup module determines whether the OS is the Windows (registered trademark) Vista or not, the setup module makes the determination by acquiring the information of the OS by a Win32 function GetOSVersion( ) included as standard equipment.

In step S1901, if the setup module determines that the OS is the second OS (YES in step S1901), in step S1902, the setup module shapes the port name into a format for the second OS. For example, the port name stored in the predetermined work area of the storage device such as the RAM 202 is the "IP_172.10.10.10", the port name is to be changed to the "172.10.10.10". Then, the processing proceeds to step S1904.

In step S1901, if the setup module determines that the OS is not the second OS (NO in step S1901), in step S1903, the setup module shapes the port name into a format for the first OS. For example, if the port name stored in the predetermined work area of the storage device such as the RAM 202 is the "IP_172.10.10.10", a change of the port name is not required and the port name is used as it is. Then, the processing proceeds to step S1904.

In step S1904, the setup module determines whether the port name shaped in step S1902 or step S1903 already exists on the PC on which the setup program is running. For example, the setup module acquires a list of the ports having been registered in the PC and the port information with using the Win32 function EnumPorts( ) or the like, prepared in the Windows (registered trademark) of the Microsoft Corporation. The setup module searches the list of the ports acquired here for the port name and determines whether the port having the name identical to the port name shaped in step S1902 or step S1903 exists.

In step S1904, if the setup module determines that the port name having been shaped does not exist (NO in step S1904), in step S1905, the setup module creates a port using the above described port name having been shaped according to a method prepared in the OS as a standard method. In step S1904, if the setup module determines that the port name having been shaped already exists (YES in step S1904), the present determination processing is ended.

The port name having been shaped in step S1902 or step S1903 becomes the port name used in updating the "silent.ini" file by the setup module in step S1807.

Figure 20:
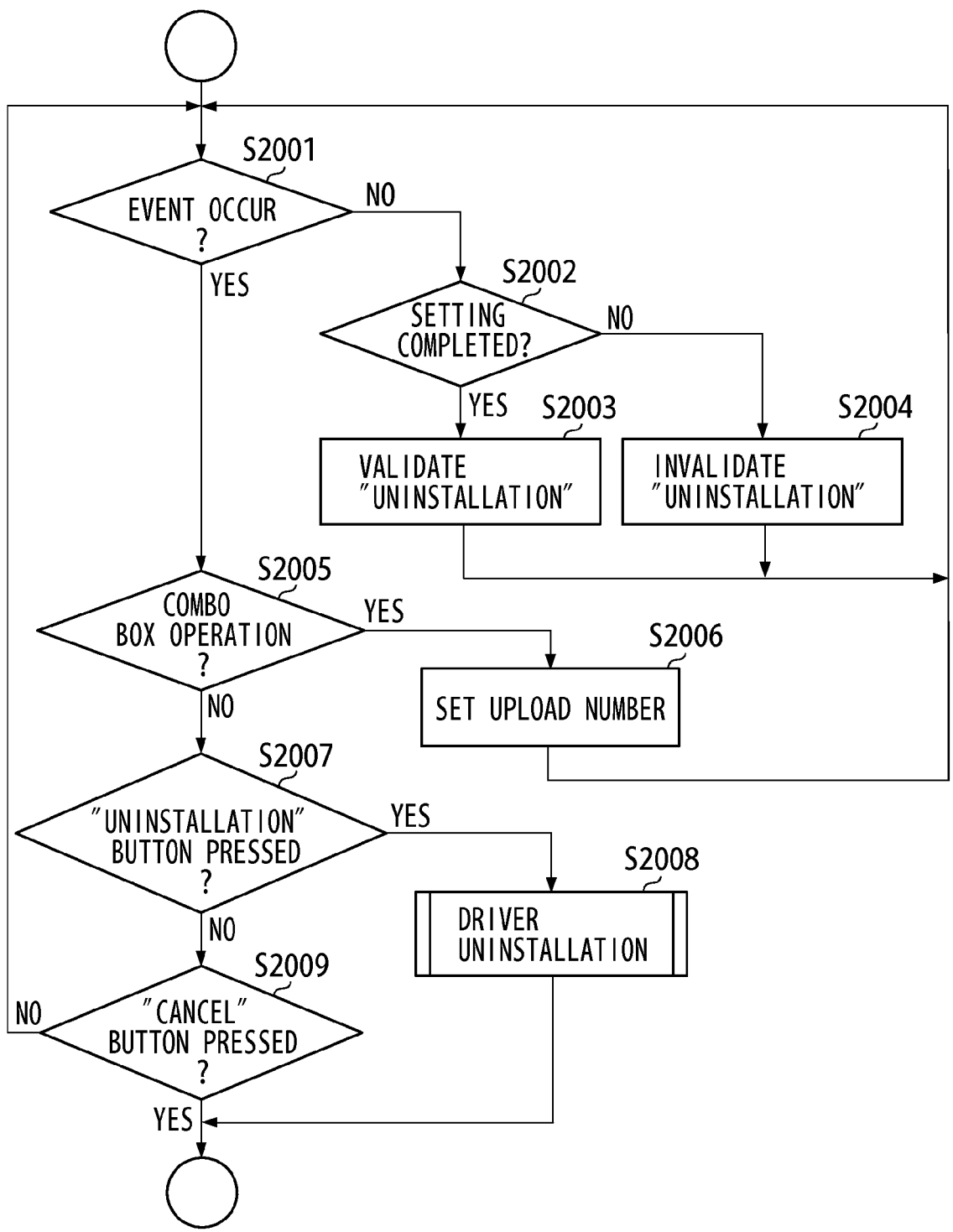
FIG. 20 is a flow chart illustrating designation processing for designating a driver to be uninstalled according to the first exemplary embodiment.

The designating processing for designating the driver to be uninstalled in step S708 in FIG. 7 is described below with reference to FIG. 20. The designating processing for designating the driver to be uninstalled is performed according to an input to the designation screen (FIG. 22) displayed on the display unit for designating the driver to be uninstalled.

In step S2001, the driver designation unit 616 confirms whether the event occurs. In step S2001, if the driver designation unit 616 determines that the event does not occur (NO in step S2001), in step S2002, the driver designation unit 616 determines whether the designation of the driver to be uninstalled is completed by the user. More specifically, if the driver designation unit 616 searches the designation screen (FIG. 22) and finds the "upload No." combo box is not blank, the driver designation unit 616 determines that the designation of the driver to be uninstalled is completed.

In step S2002, if the driver designation unit 616 determines that the designation of the driver to be uninstalled is completed (YES in step S2002), in step S2003, the driver designation unit 616 validates an "uninstallation" button on the designation screen (FIG. 22). Then, the processing returns to step S2001. In step S2002, if the driver designation unit 616 determines that the designation of the driver to be uninstalled is not completed (NO in step S2002), in step S2004, the driver designation unit 616 invalidates the "uninstallation" button on the designation screen (FIG. 22). Then, the processing returns to step S2001.

In step S2001, if the driver designation unit 616 determines that the event occurs (YES in step S2001), then in step S2005, the driver designation unit 616 determines whether the event is an operation of the "upload No." combo box. More specifically, if the event includes an ID indicating the "upload No." combo box of the designation screen for designating the driver to be uninstalled illustrated in FIG. 22 and the operation of the left button of the mouse, the driver designation unit 616 determines that the event is the operation of the "upload No." combo box (YES in step S2005). Then, the processing proceeds to step S2006.

In step S2006, the driver designation unit 616 acquires the upload number storing the driver to be uninstalled. In other words, the driver designation unit 616 reads out a numerical value set in the "upload No." combo box of the designation screen (FIG. 22) from the event and stores the read value in the predetermined work area of the storage device such as the RAM 202. Then, the processing returns to step S2001.

In step S2005, if the driver designation unit 616 determines that the event is not the operation of the "upload No." combo box (NO in step S2005), then in step S2007, the driver designation unit 616 determines whether the "uninstallation" button is pressed. More specifically, the event includes an ID indicating the "uninstallation" button on the designation screen for designating the driver to be uninstalled illustrated in FIG. 22 and the operation of the left button of the mouse, the driver designation unit 616 determines that the "uninstallation" button is pressed.

In step S2007, if the driver designation unit 616 determines that the "uninstallation" button is pressed (YES in step S2007), then in step S2008, the driver designation unit 616 returns the numerical value currently selected in the "upload No." to be stored to the device selection unit 612.

In step S2007, if the driver designation unit 616 determines that the "uninstallation" button is not pressed (NO in step S2007), then in step S2009, the driver designation unit 616 determines whether the event is a press of a "cancel" button. More specifically, if the event includes an ID indicating the "cancel" button on the designation screen (FIG. 22) and the operation of the left button of the mouse, the driver designation unit 616 determines that the "cancel" button is pressed.

In step S2009, if the driver designation unit 616 determines that the "cancel" button is not pressed (NO in step S2009), the processing returns to step S2001. In step S2009, if the driver designation unit 616 determines that the "cancel" button is pressed (YES in step S2009), the driver designation unit 616 opens the work area secured in the storage device such as the RAM 202 and the HD 205 based on a predetermined procedure, and performs the end processing.

Figure 21:
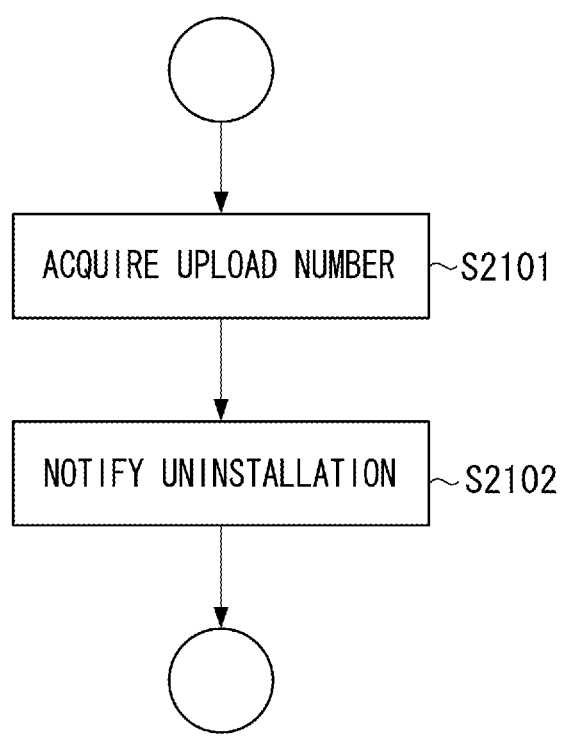
FIG. 21 is a flow chart illustrating uninstallation processing for uninstalling a real driver according to the first exemplary embodiment.

The driver uninstallation processing in step S709 in FIG. 7 is described below with reference to FIG. 21. It is assumed that the upload number of the setup program to be uninstalled and the list of the devices to be uninstalled are passed from the device selection unit 612 to the uninstallation unit 617 and stored in the work area secured in the storage area such as the RAM 202.

In step S2101, the driver uninstallation unit 617 uses the CPU 200 to acquire the upload number from the work area secured in the storage area such as the RAM 202. In step S2102, the uninstallation unit 617 notifies the printer 105 of the uninstallation. In other words, the uninstallation unit 617 extracts information about the device to be subjected to the uninstallation processing among the device list and notifies the device of the upload number together with an uninstallation command of the setup program using a communication unit based on a predetermined procedure. Then, the uninstallation unit 617 deletes the information and the like stored in the work area secured in the storage area such as the RAM 202 and ends the present processing.

A second exemplary embodiment of the present invention is described below. In the processing in FIG. 19 according to the above described first exemplary embodiment, the port name of the port to be newly created is variable according to the attribute (i.e., the type or the version) of the OS. The processing for comparing the port name with the currently existing port name is also described in the first exemplary embodiment.

However, in the standard TCP/IP port included in the OS as standard equipment, since the user can freely change the port name, there is a case where the port name differs from a transmission destination assumed therefor. For example, with respect to a certain port, there may be such a case that the port has the port name of "IP__172.10.10.10" and the IP address of the transmission destination of the print data is "172.20.20.20". Accordingly, creating the ports having the same transmission destination in duplicate may not be avoided with the determination based on the port name as the standard.

Further, there is such a case that an outdated environment remains for the reasons that, for example, the OS is to be upgraded from the first OS to the second OS. More specifically, there may be the port having the port name of "IP__172.10.10.10" that is created with the format of the first OS as the port having been registered in the second OS.

Therefore, in the present exemplary embodiment, a method for determining the duplication of the port on the client is described based on the transmission destination of print data mapped on the port. For the sake of a simple description, only points different from those according to the first exemplary embodiment are described below.

Figure 23:
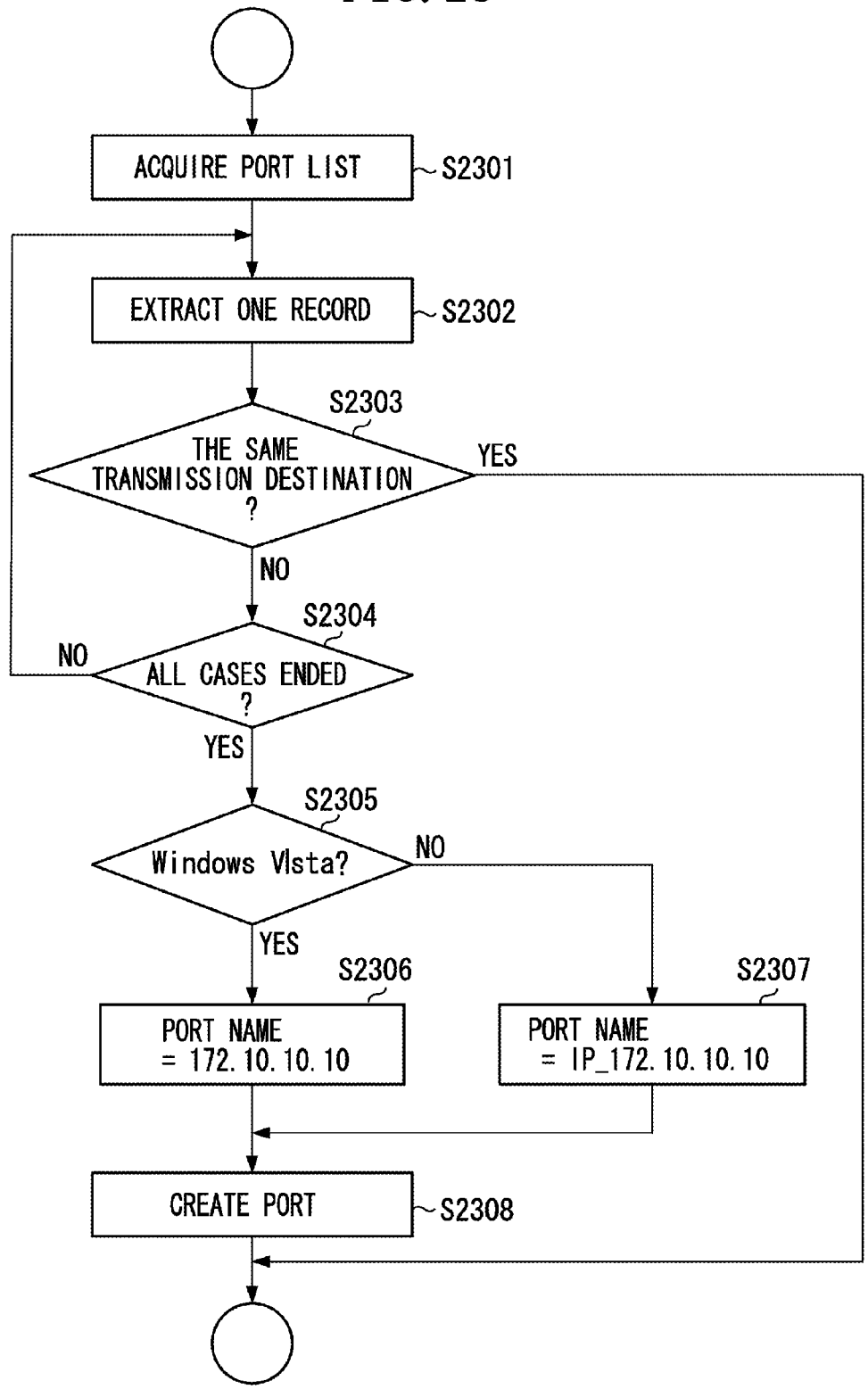
FIG. 23 is a flow chart illustrating determination processing according to a second exemplary embodiment.

The processing for determining the port name to be used in step S1805 in the flow of FIG. 18 is described in the present exemplary embodiment with reference to FIG. 23. It is assumed that the port name described in the "silent.ini" file separated in step S1804 is stored in the predetermined work area of the storage device such as the RAM 202.

In step S2301, the setup module acquires a list of ports having been registered in the PC. For example, the setup module acquires the list of the ports having been registered in the PC and the port information with using the Win32 function EnumPorts( ) or the like, prepared in the Windows (registered trademark) of the Microsoft Corporation.

In step S2302, the setup module extracts a single record including the port name and the transmission destination of the print data from the acquired list of ports and stores the record in the predetermined work area of the storage device such as the RAM 202. In step S2303, the setup module compares the transmission destination of the print data of the stored record with the information included in the "silent.ini" file stored in the predetermined work area of the storage device such as the RAM 202.

For example, the port having the port name of the "IP__172.10.10.10" is included in the "silent.ini" file. In this case, the transmission destination of the print data of the port is identified as the "172.10.10.10". If both of the identified transmission destination and the transmission destination of the print data of the stored record have the same port name, i.e., "172.10.10.10", in step S2303, the setup module determines that the transmission destinations match to each other.

In step S2303, if the setup module determines that the transmission destination of the print data matches (YES in step S2303), the setup module changes the port name described in the "silent.ini" file stored in the predetermined work area of the storage device such as the RAM 202. More specifically, the port name described in the "silent.ini" file stored in the work area is overwritten with the port name described in the record extracted in step S2302. Then, the determination processing for determining the name of the port to be used is ended.

In step S2303, if the setup module determines that the transmission destination of the print data does not match (NO in step S2303), then in step S2304, the setup module determines whether the determination in step S2303 is ended with respect to all the ports in the list of ports acquired in step S2301. In step S2304, if the setup module determines that the determination in S2303 is not ended with respect to all the ports in the list of ports acquired in step S2301 (NO in step S2304), the processing returns to step S2302.

In step S2304, if the setup module determines that the determination in S2303 is ended with respect to all the ports in the list of ports acquired in step S2301 (YES in step S2304), in step S2305, the setup module starts up the program to determine the attribute (i.e., the type or the version) of the OS of the PC. In this step, the setup module determines whether the OS running on the client 102 is the second OS or not.

In step S2305, if the setup module determines that the OS is the second OS (YES in step S2305), then in step S2306, the setup module shapes the port name into the format of the second OS. For example, if the port name described in the "silent.ini" file stored in the predetermined work area of the storage device such as the RAM 202 is the "IP_172.10.10.10", the setup module changes the port name to the "172.10.10.10". Then, the processing proceeds to step S2308.

In step S2305, if the setup module determines that the OS is not the second OS (NO in step S2305), then in step S2307, the setup module shapes the port name into the format of the first OS. For example, if the port name described in the "silent.ini" file stored in the predetermined work area of the storage device such as the RAM 202 is the "IP_172.10.10.10", the setup module does not change the port name. Then, the processing proceeds to step S2308.

In step S2308, the setup module creates a port having the port name shaped in step S2306 or step S2307 using the unit included in the OS as standard equipment.

Finally, the port name according to any one of the steps S2306, S2307, or S2309 becomes the port name to be used by the setup module in the update of the "silent.ini" file in step S1807

In the above description, as the transmission destination of the print data to which the port is mapped, the "Internet Protocol Ver. 4" type IP address is exemplified for the sake of an explanation. However, the present invention can be applied to the other type of IP address. The present invention may be also applied to a local port (e.g., a LPT, a COM, a USB, and an IrDA) and a host name other than the network address. As an example of the device, the printer is exemplified for the sake of explanation. However, the device is not limited to the printer. The present invention can be applied to a multifunction peripheral having a print function and a facsimile machine being operated with a facsimile driver having a configuration equivalent to the printer driver.

In the above described procedures, an automatic determination of the port name for each OS upon installation of the logical printer enables the user to reduce work for designating the port name. Thus, a resource wasting of, for example, creation of a plurality of ports in the same IP address due to carelessness such as an input error can be avoided.

Further, an automatic determination of the IP address in use by the port, even if the format of the existing port name is different from the standard format of the OS, can avoid the duplicated creation of the ports with respect to the same IP address. Therefore, the user can reduce the work of determining whether there is the duplicate of the ports by visually confirming the IP address to be used for each port in order to avoid creation of the duplicated ports. Accordingly, a burden applied to the user upon installation of the printer can be reduced and the user-friendliness improves.

The present invention can also be realized by executing the following process. That is, a process in which a software (program) that realizes the functions of the above-described embodiments is supplied to the system or apparatus via a network or a recording medium of various types, and then a computer of the system or apparatus (or devices such as CPU or MPU) reads out the program and executes it. In such a case, the recording medium where the program is stored as well as the program are included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2010-132136 filed Jun. 9, 2010 and No. 2011-005953 filed Jan. 14, 2011, which are hereby incorporated by reference herein in their entirety.

What is claimed is:

1. A printing system including a management apparatus, a printer and an information processing apparatus:
a display unit configured to display a screen for edit of information by a user, the information being related to a setup program related to a printer driver; and
an upload unit configured to upload to the printer the setup program with which an installer serving as an application for installing the printer driver into the information processing apparatus is combined, according to an instruction of the user via the displayed screen;
wherein a storage unit of the printer stores the setup program uploaded by the upload unit;
wherein the printer includes:
a monitoring unit configured to monitor a change of configuration information of the printer within the printer; and
a program update unit configured to update, without an instruction of the user, information related to a port in a file in which information for the installer combined with the setup program is described, based on a command for updating the setup program according to the change of the configuration information from the monitoring unit; and
wherein the information processing apparatus includes:
a storing unit configured to acquire the setup program from the printer and to store the setup program in a storage unit of the information processing apparatus;
a separation unit configured to separate the file from the stored setup program after starting up the stored setup program;
an identification unit configured to identify an attribute of an operating system (OS) running on the information processing apparatus after starting up the stored setup program;
a determination unit configured to determine a format of a port name of a port to be created for the printer driver to be installed, according to the attribute of the OS identified by the identification unit; and
a control unit configured to create the port having the port name according to the information related to the port included in the separated file and the format determined by the determination unit and to install the printer driver using the installer combined with the setup program.

2. An information processing apparatus including a storage unit, the information processing apparatus comprising:
- an identification unit configured to identify an attribute of an operating system (OS) running on the information processing apparatus if a device driver for controlling a device is installed;
- a determination unit configured to determine a format of a port name of a port to be created for the device driver to be installed, according to the attribute of the OS identified by the identification unit; and
- a control unit configured to create the port having the port name according to information related to a port included in a file acquired via a download page provided by the device and stored in the storage unit and the format determined by the determination unit and to control, by using an installer combined with the file, an installation of the device driver in which the created port is set,
- wherein the file which is displayed on the download page and with which the installer is combined is uploaded to the device by a management apparatus,
- wherein the management apparatus is configured to display a screen for editing contents of the file, and
- wherein the information related to the port included in the file has been updated at the device based on a command according to a change of configuration information by a monitoring unit of the device.

3. The information processing apparatus according to claim 2, wherein the identification unit identifies a version as the attribute of the OS.

4. The information processing apparatus according to claim 2, further comprising:
- a decision unit configured to determine whether a transmission destination of data of the port created by the control unit matches a transmission destination of data of an existing port of the information processing apparatus,
- wherein, if the decision unit determines that the transmission destinations do not match to each other, the control unit installs the device driver to which the created port is set.

5. The information processing apparatus according to claim 2, wherein the device is a printer and the device driver is a printer driver.

6. The information processing apparatus according to claim 2:
- wherein the device stores a setup program which is created according to an instruction of a management apparatus connected to the device and configured to install the device driver; and
- wherein control of the installation by the control unit is realized by an execution of the setup program acquired from the device and a separation of the file of the setup program.

7. The information processing apparatus according to claim 2, wherein the contents of the file include name information of the device driver and comment information.

8. A method for information processing of an information processing apparatus including a storage unit, the method comprising:
- identifying an attribute of an operating system OS running on the information processing apparatus if a device driver for controlling a device is installed;
- determining a format of a port name of a port created for the device driver to be installed according to the identified attribute of the OS; and
- creating the port having the port name according to information related to a port included in a file acquired via a download page provided by the device and stored in the storage unit and the determined format, by using as installer combined with the file;
- controlling an installation of the device driver in which the created port is set,
- wherein the file is displayed on the download page and with which the installer is combined is uploaded to the device by a management apparatus,
- wherein the management apparatus is configured to display a screen for editing contents of the file, and
- wherein the information related to the port included in the file has been updated based on a command for updating a setup program according to a change of configuration information.

9. A non-transitory computer readable storage medium on which is stored a computer program for making a computer execute a method for an information processing apparatus having a storage unit, the method comprising the steps of:
- identifying an attribute of an operating system OS running on the information processing apparatus if a device driver for controlling a device is installed;
- determining a format of a port name of a port created for the device driver to be installed according to the identified attribute of the OS; and
- creating the port having the port name according to information related to a port included in a file acquired via a download page provided by the device and stored in the storage unit and the determined format, by using as installer combined with the file;
- controlling an installation of the device driver in which the created port is set,
- wherein the file is displayed on the download page and with which the installer is combined is uploaded to the device by a management apparatus,
- wherein the management apparatus is configured to display a screen for editing contents of the file, and
- wherein the information related to the port included in the file has been updated based on a command for updating a setup program according to a change of configuration information.

* * * * *